Jan. 28, 1947.  J. KUNZ  2,414,818
INKER AND INKING METHOD
Filed Aug. 3, 1940   12 Sheets-Sheet 1

INVENTOR
John Kunz

INVENTOR
John Kunz

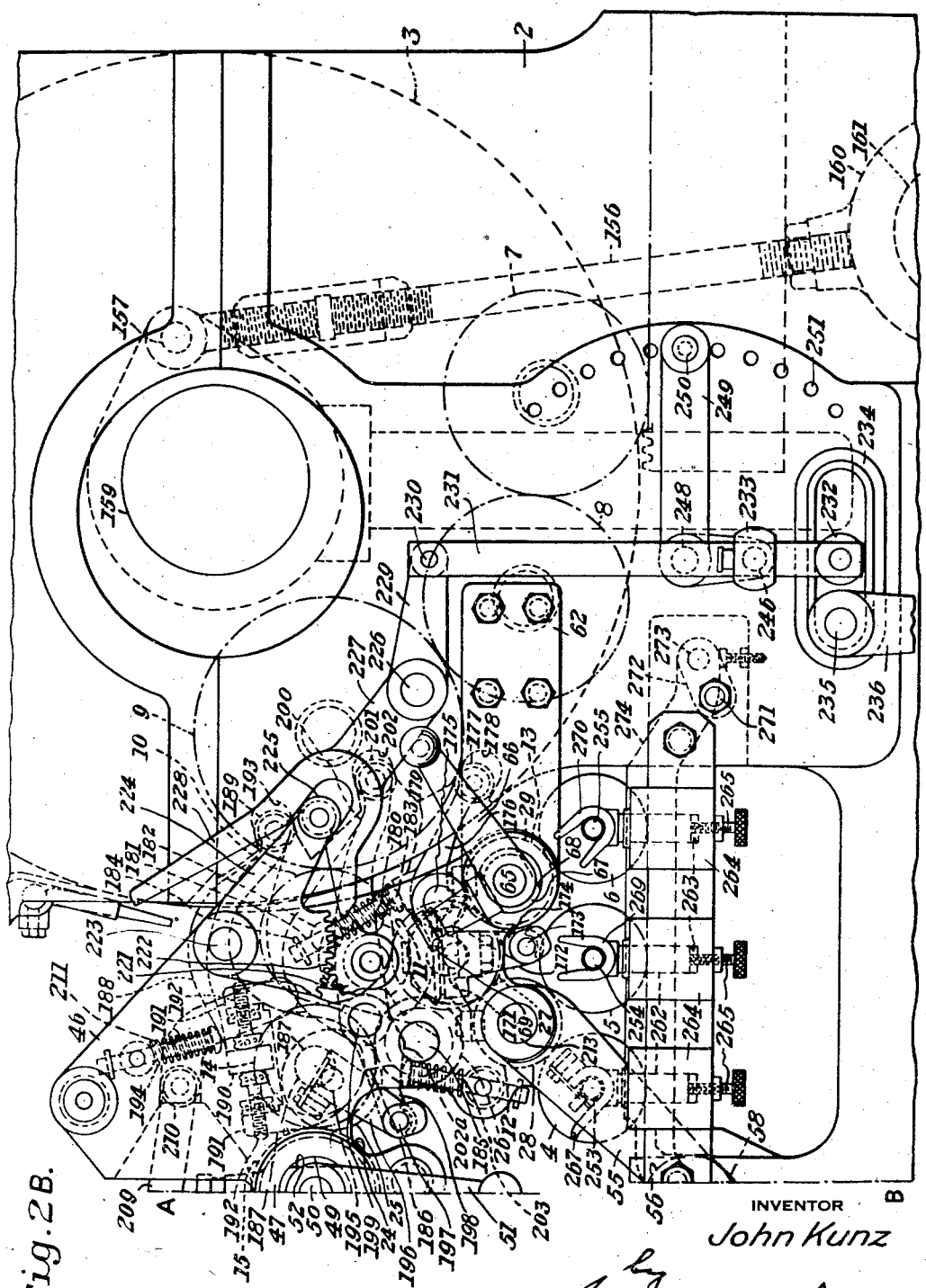

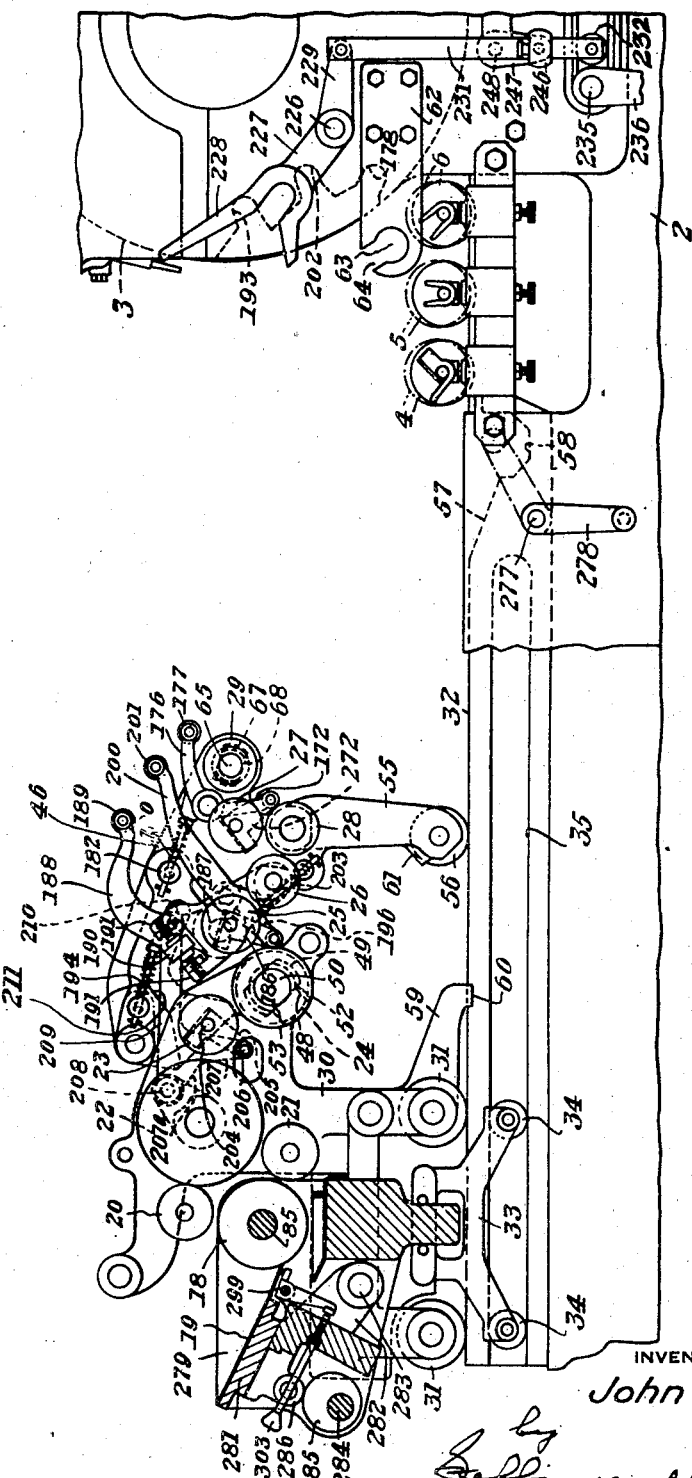

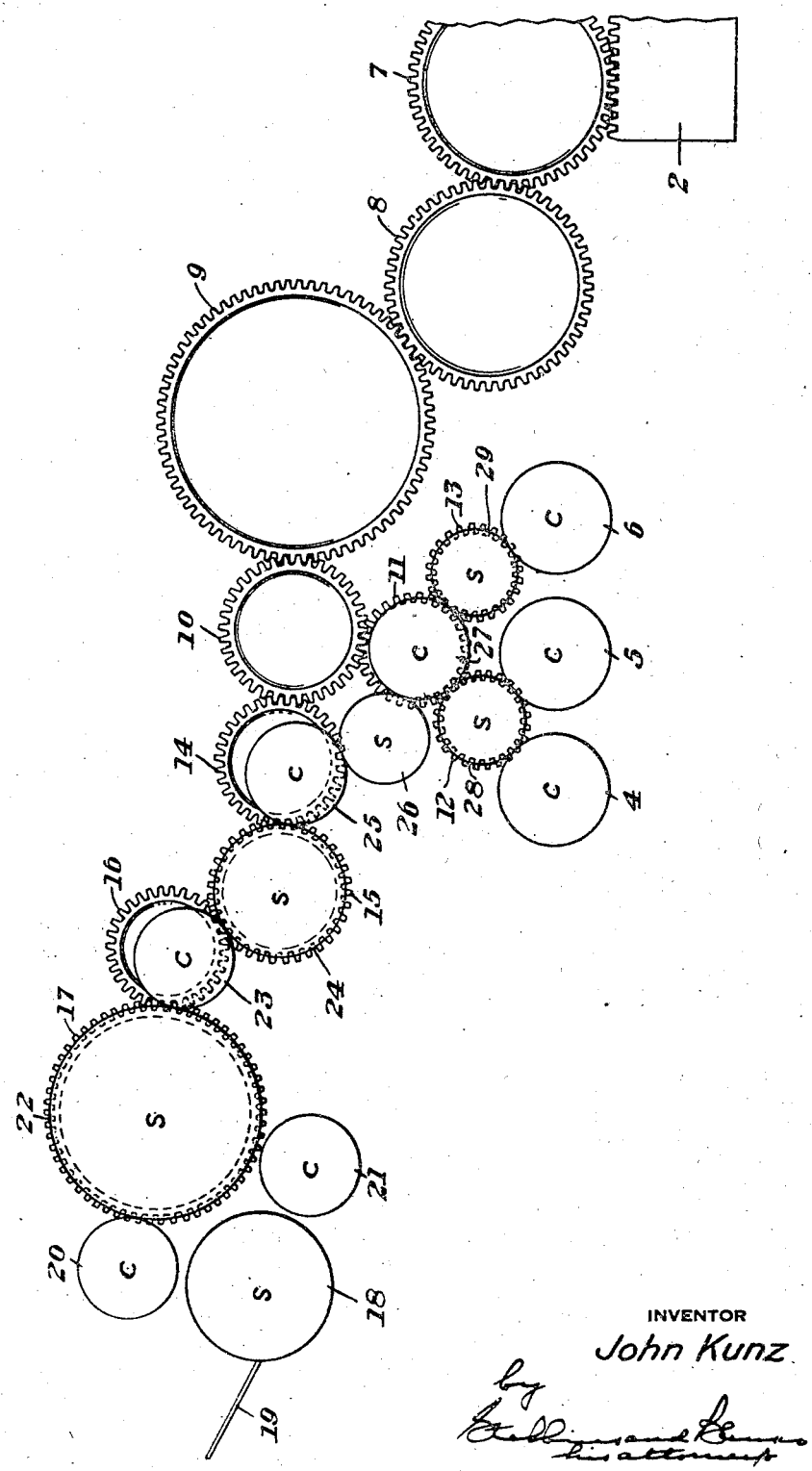

Jan. 28, 1947.   J. KUNZ   2,414,818
INKER AND INKING METHOD
Filed Aug. 3, 1940   12 Sheets-Sheet 7

INVENTOR
John Kunz

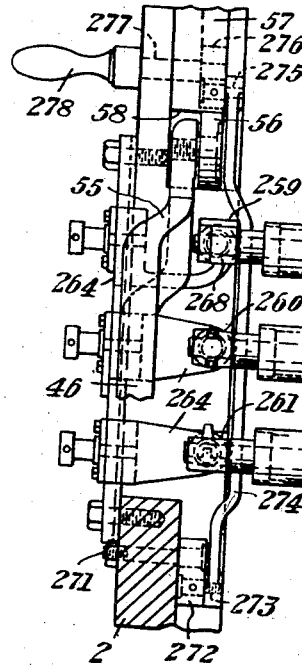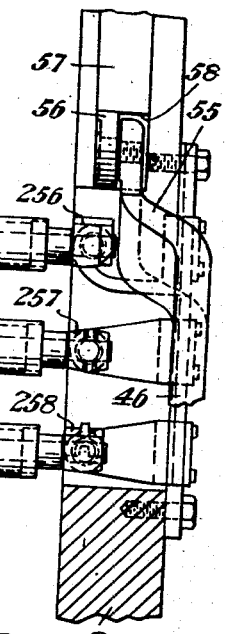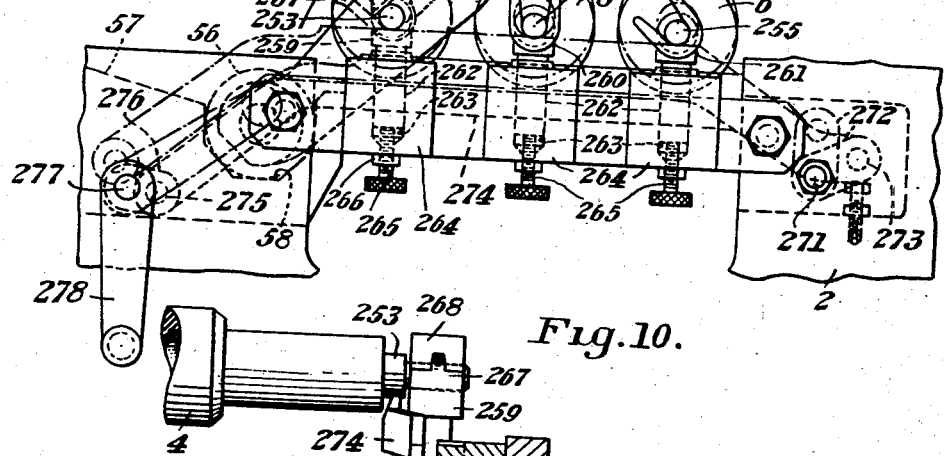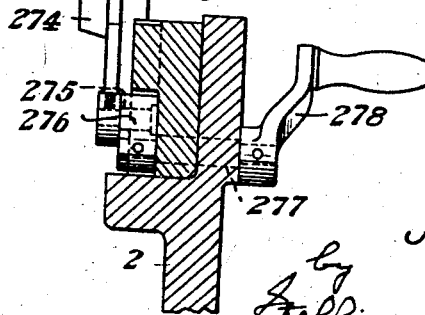

Jan. 28, 1947.                    J. KUNZ                    2,414,818
                           INKER AND INKING METHOD
                            Filed Aug. 3, 1940                 12 Sheets-Sheet 9
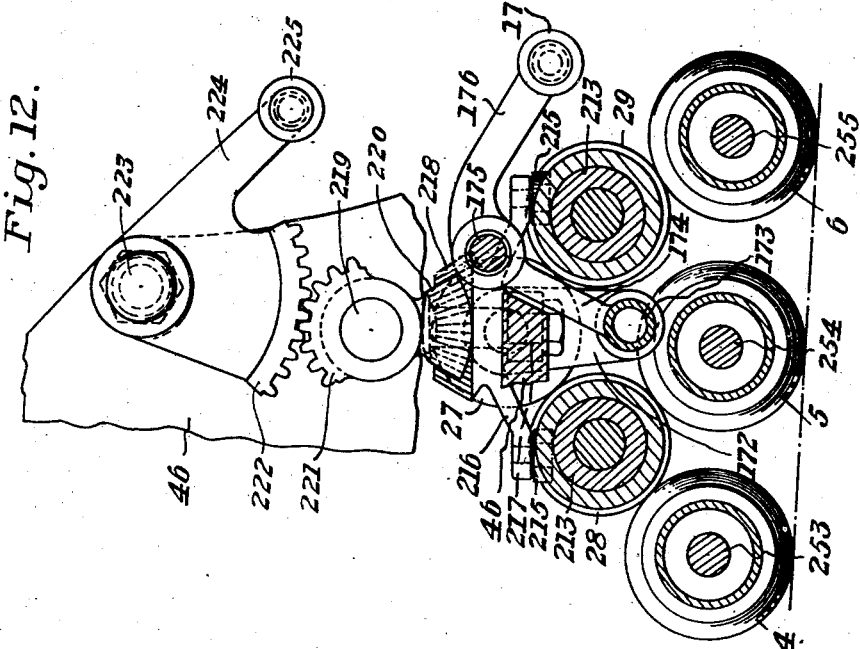
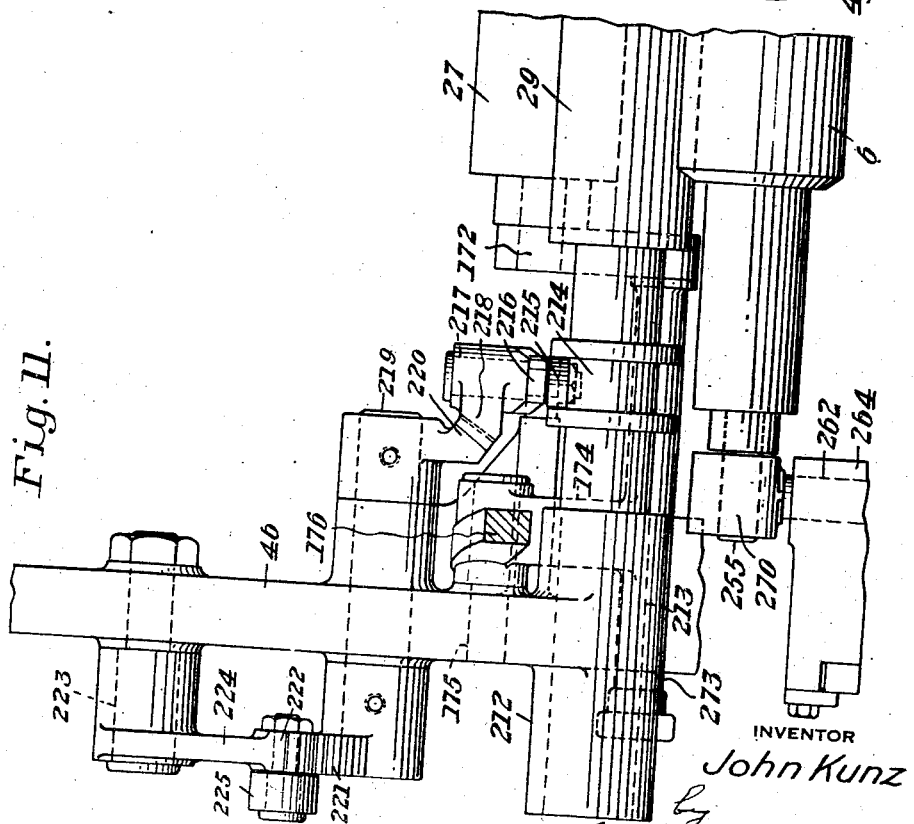
INVENTOR
John Kunz Jan. 28, 1947.  J. KUNZ  2,414,818
INKER AND INKING METHOD
Filed Aug. 3, 1940  12 Sheets-Sheet 10
Fig. 13.
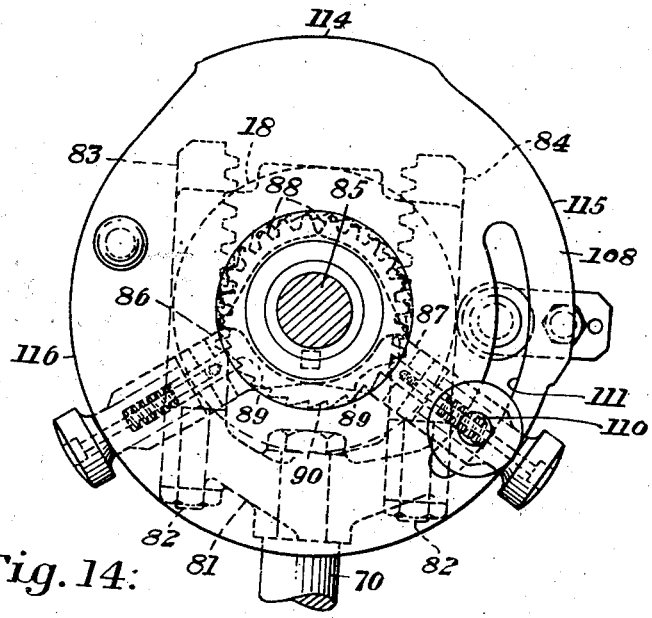
Fig. 14.
Fig. 15.
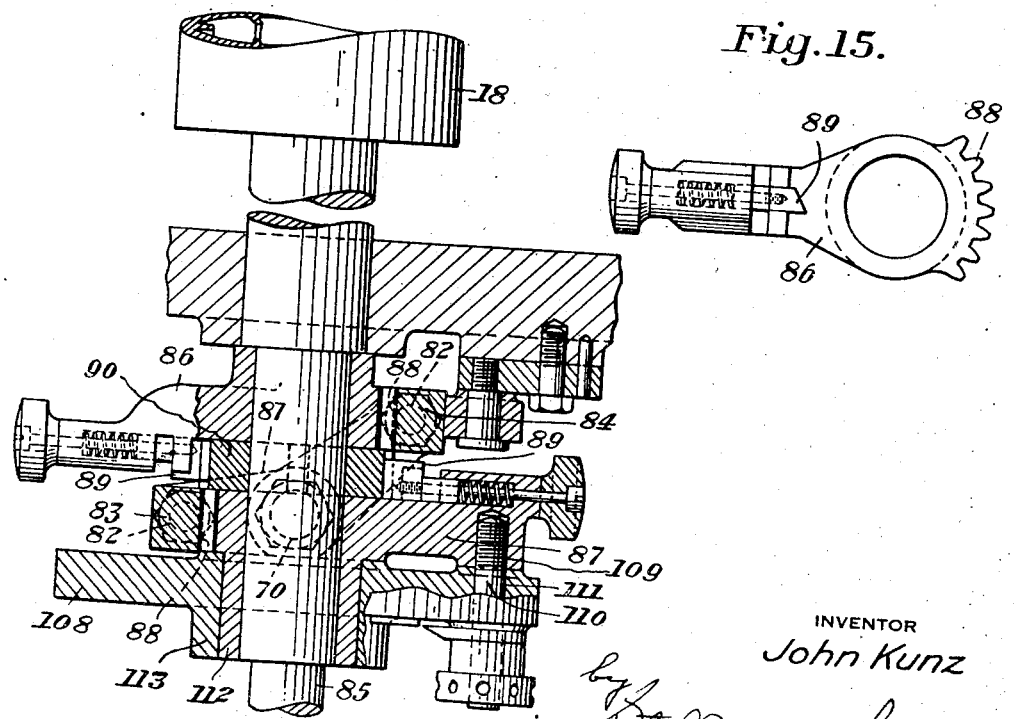
INVENTOR
John Kunz Jan. 28, 1947.  J. KUNZ  2,414,818
INKER AND INKING METHOD
Filed Aug. 3, 1940  12 Sheets-Sheet 12

INVENTOR
John Kunz

Patented Jan. 28, 1947

2,414,818

UNITED STATES PATENT OFFICE 2,414,818

INKER AND INKING METHOD

John Kunz, Pittsburgh, Pa., assignor to Miller Printing Machinery Co., Pittsburgh, Pa., a corporation of Pennsylvania Application August 3, 1940, Serial No. 350,705

89 Claims. (Cl. 101—357)

This invention relates to an inker for printing presses and a method of inking the form of a printing press.

The inker and inking method of the present invention are, so far as I am aware, basically new, the structure of the inker throughout being conceived and executed along novel and unusual lines and having great utility and importance in operation. Virtually all portions of the inker are believed to contain new and highly useful features. Since the inker structure is complicated it follows that the invention comprises a large number of novel structures and combinations.

One of the objects of the invention is to improve the inking of the form. Referring, for example, to presses of the flat bed and cylinder type, the bed reciprocates or oscillates back and forth, the cylinder coming down on impression to print a sheet on a stroke of the bed in one direction and being raised when the bed moves in the opposite direction. The form rollers of the inker roll over the form upon each oscillation of the form in each direction, but in prior inkers fresh ink has been supplied to the form rollers only once during each cycle of the press. For example, the form rollers may have received fresh ink for application to the form only upon the printing stroke. This means that upon the reverse stroke of the form the form rollers rolled over the form while carrying only the uneven residual layer of the ink which they carried upon the immediately preceding impression stroke since the form rollers gave up a portion of their ink to the form during the impression stroke. The result is that on the reverse stroke of the form the form rollers could not and did not apply fresh ink to the form and indeed were deficient in fresh ink at a time when its availability at the form rollers would have been of great value.

The form gives up a quantity of its ink to the sheet being printed upon each printing stroke. While the form rollers roll over the form twice between printing impressions, on only one of these two occasions did the form rollers of prior inkers carry fresh ink which had not previously been rolled over the form. This sometimes resulted in the formation of so-called blank spots or localized portions on the form where there was insufficient ink and also often resulted in undesirable images of one part of a form being carried, by the form rollers as they revolved, to other parts of the form, which images appeared in various intensities on the printed sheet, such images being commonly known in the printing industry by various terms such as "repeats," "ghosts," "shadows," etc.

Inking in the manner above described was sometimes satisfactory, particularly, in the case of certain type forms, when the type was distributed uniformly over the form. In other cases such inking was not satisfactory, yet up to the present invention it was the only way known and was generally used despite its shortcomings. The form should, of course, bear a uniform coating of fresh ink upon the printing stroke. If blank spots are not completely covered up and the ink throughout the form distributed uniformly the results cannot be relied upon.

I provide for applying fresh ink to the form upon each oscillation of the form in each direction of oscillation. In order to do this I apply fresh ink to the form rollers twice during each cycle of the press so that upon each contact of the form rollers with the form they will apply fresh ink to the form instead of applying fresh ink only upon each alternate contact with the form. This insures proper inking of the form under practically any condition met with in printing. For application of a given amount of fresh ink per cycle of the press only half of the amount of ink to be applied per cycle need be applied upon each contact of the form rollers with the form, thus facilitating uniform application and spreading of the ink. Blank spots, "ghosts," "repeats" and "shadows" are more easily and more certainly eliminated.

I preferably deliver fresh ink from the fresh ink supply upon each movement of the form in each direction of oscillation so that upon each such movement of the form fresh ink moves through the inker from the fresh ink supply toward the point of application to the form. I find it advantageous to make the length of the path of the ink through the inker and the speed of operation such that ink from the fresh ink supply moves through the inker during movement of the form in one direction to reach at the end of such movement a point approximating the point of application to the form so that upon the immediately succeeding movement of the form in the opposite direction such fresh ink will be applied to the form. In other words, fresh ink delivered from the fresh ink supply during an oscillatory movement of the form in one direction of oscillation preferably reaches the form inking means during that same movement and is applied to the form during the succeeding or return oscillatory movement of the form in the opposite direction of oscillation. In some cases it is desirable that fresh ink delivered from the ink supply during an oscillatory movement of the form in one direction of oscillation reach the form inking means during that same movement but be not applied by the form inking means to any considerable area of the form until the succeeding oscillatory movement of the form in the opposite direction of oscillation. This is to avoid uneven inking of the form under certain form conditions. However, in practice I find that if the fresh ink moving toward the point of application to the form upon a stroke of the form in one direction approximately reaches the point of application at the end of such stroke, though such point may be reached slightly before the end of the stroke or not quite reached at the end of the stroke, the results obtained are satisfactory.

In delivering fresh ink from the fresh ink supply upon each stroke of the form in each direction I preferably employ ductor means shiftable between the fresh ink supply and the transfer means which delivers the ink to the form inking means. Such ductor means operates to deliver fresh ink upon each oscillation of the form in each direction of oscillation. I find it preferable to employ a plurality of successively operable ductor rollers. I find that two opposed ductor rollers shifting between the fresh ink supply and the transfer means for carrying the ink forward to the point of application to the form are most satisfactory and preferably the shifting movement of these two ductor rollers is such that while one is receiving ink from the fresh ink supply the other is delivering fresh ink to the transfer means. Preferably the ductor rollers contact a fountain roll which as usual turns only in one direction and I find it advantageous to advance the fountain roll in its turning movement step by step, one step upon each oscillation of the form in each direction of oscillation. Since the fountain roll turns only in one direction and the opposed ductor rollers contact it alternately, one of the ductor rollers may engage the fountain roll at a point on its peripheral surface in advance of another point on such surface from which ink has previously been taken by the other ductor roller. I find it desirable to so correlate the operations of the fountain roll and the ductor rollers that each ductor roller always engages only a portion of the surface of the fountain roll carrying fresh ink which has not previously been engaged by the other ductor roller. To this end I have provided novel means for advancing the fountain roll and correlating its advance with the shifting of the ductor rollers.

I preferably make the inker in a plurality of sections so that on occasion less than the entire inker may be moved individually away from inking position. One section of the inker preferably comprises the ink fountain and the ductor means while another section preferably comprises transfer means for transferring ink from the first section toward the point of application of ink to the form. Preferably the form rollers are separate from each of these sections. The sections may be connected together and the inker may be fastened in inking position by separable connections, and I provide novel and easily operable connections for this purpose.

Preferably the section of the inker comprising the ink fountain, which section may be termed the fountain inker, is movable toward and away from inking position independently and with straight line or substantially straight line movement. I find it desirable in moving out of inking position the second section of the inker, which for convenience may be termed the vibrator inker, to swing the same generally upwardly and away from the cylinder. This facilitates clearing of the form rollers and also enables those portions of the inker which are shiftable out of inking position to be shifted to a point which renders the form rollers and the form accessible so that work can be done thereon without moving the entire inker as great a distance as it would have to be moved if all parts of it could be moved only in translation. This saving of space is highly important from the practical standpoint as it may result in enabling the apparatus to be installed in a space in which otherwise it could not be installed.

Also I provide for printing throughout a desired length of form with a shorter stroke of the form and bed than heretofore. This likewise is of great practical importance due to space limitations in printing shops and to the added convenience to the operator in handling the shorter and more compact press.

I provide novel means insuring stopping of the ductor rollers in intermediate position out of contact with any other surface upon stopping and particularly upon tripping of the press, thus automatically obviating flat surfaces on the ductor rollers and the caking of ink on the fountain roll or ductor rollers.

I provide for automatically separating composition rollers from metal or other rollers upon movement of the inker or a portion thereof out of inking position. The word "composition" as used herein means relatively soft surfaced rollers the surfaces of which may be made out of gelatinous compositions, rubber or other material.

I provide novel means for simultaneously raising the form rollers to a position in which they are out of the path of the form. I also provide means enabling removal of at least one of the form rollers while the inker is in inking position without moving any other roller.

I provide novel means for vibrating the vibrator rollers and also novel, convenient and rapid means of adjustment of the amplitude of endwise vibration of the vibrator rollers. I can obtain unusually great endwise vibration. The amplitude of endwise vibration of the vibrator rollers may be adjusted as desired between zero and 3 inches or more.

Portions of the inker are driven by individual connections directly from the press, which greatly simplifies the inker drive. Disengageable connections are preferably employed so that when the inker or a portion thereof is moved out of inking position such connections will automatically disengage. Such connections are also preferably of such character that upon movement of the inker or a portion thereof toward the press cylinder or into inking position they will automatically become operative. I find oscillatable fork driving connections to be particularly suitable for this purpose.

I provide improved means for adjusting the fountain blade and an improved arrangement of the fountain blade keys. I also provide improved means for bodily moving the fountain blade into and out of operative position.

In the above introductory portion of this specification I have made no attempt to catalog all of the improvements of my inker, but I have simply mentioned a few of them to indicate the general nature of the invention. The apparatus is believed to be new substantially throughout, although, of course, old mechanical motions are used in places. Other details, objects and advantages of the invention will become apparent as the following description of a present preferred embodiment of the invention and a present preferred method of practicing the same proceeds.

In the accompanying drawings I have shown a present preferred embodiment of the invention and have illustrated a present preferred method of practicing the same, in which Figure 1 is a side elevational view of an inker, certain parts being omitted for clarity;

Figures 2A and 2B together constitute an enlarged side elevational view of a portion of the inker shown in Figure 1, Figures 2A and 2B being adapted to be joined together along the line A—B;

Figure 3 is a side elevational view somewhat similar to Figure 1 but partly in vertical longitudinal cross section and showing certain parts not shown in Figure 1, the inker being shown in Figure 3 in retracted position moved away from the press cylinder;

Figure 4 is a diagrammatic view illustrating the rollers of the inker and the inker gear drive;

Figure 8 is a fragmentary plan view of the form rollers and the means for raising the same;

Figure 9 is a fragmentary elevational view of the form rollers and the means for raising the same, the form rollers being indicated in raised position in chain lines and the portion of the inker above the form rollers being indicated fragmentarily in operative position in solid lines and in somewhat raised position in chain lines;

Figure 10 is a fragmentary vertical transverse cross-sectional view showing the means for raising the form rollers;

Figure 11 is a fragmentary vertical transverse cross-sectional view of the right-hand portion of the inker viewing Figure 1;

Figure 12 is a vertical longitudinal cross-sectional view through the right-hand portion of the inker viewing Figure 1;

Figure 13 is a fragmentary elevational view of a portion of the means for advancing the fountain roll and the ductor roller control cam;

Figure 14 is a horizontal cross-sectional view through the means shown in Figure 13 but with the pawls raised to horizontal position;

Figure 15 is a detail face view of one of the pawls and its mounting means;

Referring now more particularly to the drawings, there is shown an inker for a printing press of the flat bed and cylinder type. The press per se is not shown in detail and may be, for example, a standard Miller press. The press bed carrying the printing form oscillates or reciprocates in a horizontal plane, the printing cylinder being mounted above the bed and rotating continuously in one direction. Upon forward movement of the bed or form on a printing stroke the cylinder is lowered so as to cooperate with the form to print a sheet. Upon reverse or rearward movement of the form the cylinder is raised thereabove. These are the standard operations of a flat bed and cylinder type press.

Figure 1:
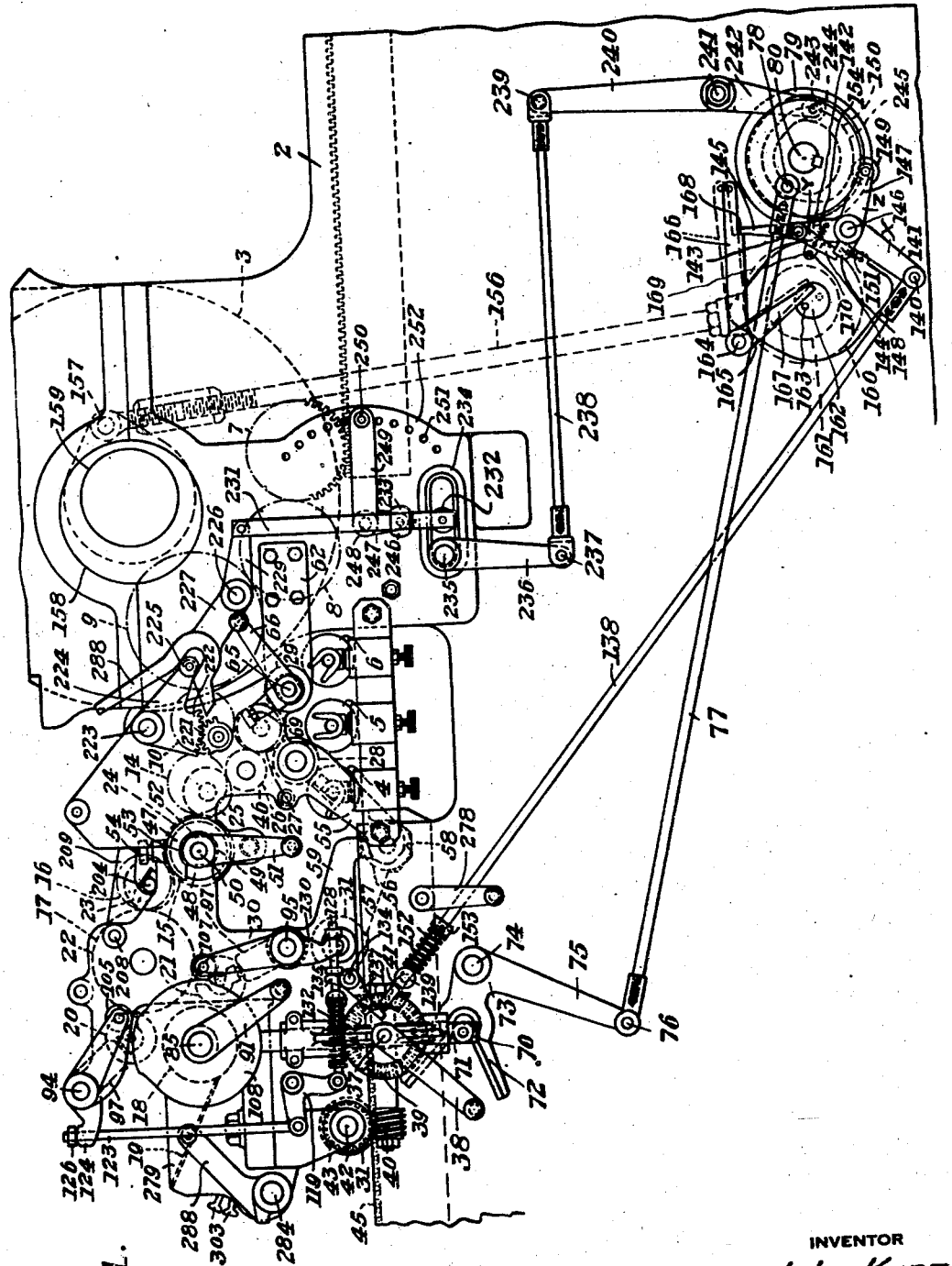

In the drawings the form is not shown in detail, although one of the bed racks is designated by reference numeral 2. Since the form is fixedly mounted on the bed it is in effect unitary with the bed rack 2 and oscillates therewith. The printing cylinder is designated by reference numeral 3 and is shown in Figures 1, 2B and 3. As shown in these figures the cylinder rotates in the counter-clockwise direction. The means for rotating the cylinder are not shown but may be of standard construction. The form and bed rack 2 oscillate in a horizontal plane beneath the cylinder 3, the means for oscillating the same not being shown but being preferably of standard construction. The means for rotating the cylinder and the means for oscillating the bed are, of course, interrelated so that the cylinder rotates through one revolution upon each oscillatory movement of the bed in each direction of oscillation—in other words, for each cycle of the bed the cylinder makes two revolutions.

The inker when in inking position is disposed immediately to the left of the cylinder 3 viewing Figure 1. In Figure 1 the inker is shown in inking position with the bed and form at or near the extreme right-hand end of their stroke and the cylinder raised for the return movement of the bed (the printing stroke being, of course, during the movement of the bed toward the right when the cylinder is down on impression and the cooperating portions of the cylinder and bed are moving in unison).

The form is inked by three form rollers designated respectively 4, 5 and 6. When these form rollers are in inking position as shown in Figure 1 they are adapted to engage and roll over the form when the form passes thereunder and apply ink to it. The form moves between an extreme right-hand position viewing Figure 1 in which its left-hand edge is slightly to the right of a vertical plane passing through the axis of the cylinder and an extreme left-hand position in which its right-hand edge is slightly to the left of a vertical plane passing through the axis of the form roller 4. Thus the form rollers 4, 5 and 6 roll over the form twice during each cycle of the press, once when the form is moving from left to right upon the impression stroke and once when the form is moving from right to left upon the reverse stroke.

The inker is movable into and out of inking position by movement toward and away from the cylinder. When the inker is moved out of inking position it is moved generally toward the left viewing Figure 1. Although the form rollers 4, 5 and 6 are a part of the inker in that they receive the ink from the ink supply and apply such ink to the form they do not move with the remainder of the inker out of inking position. This may be seen at a glance in Figure 3 where the form rollers 4, 5 and 6 are shown in operative position and the remainder of the inker in inoperative position. The inker, except the form rollers, comprises two parts or sections, a primary section which includes the ink fountain and means for delivering ink therefrom toward the point of application to the form and a secondary section which includes means for receiving ink from the primary section and delivering the same further toward the point of application to the form. The primary section is also referred to as the fountain inker and the secondary section is also referred to as the vibrator inker. Upon movement of the inker out of inking position the fountain inker and vibrator inker partake of differential movement, as will presently be described. Moreover, the fountain inker may be moved out of inking position while the vibrator inker remains in inking position.

The function of the inker is to deliver fresh ink to the form and, as will presently be described, fresh ink is delivered to the form upon each oscillatory movement of the form in each direction of oscillation. This is accomplished by rollers which successively transfer ink from one to another to advance the ink to the form rollers which apply it to the form. Most of the rollers of the inker change their direction of rotation when the form changes its direction of oscillation so that while the form is partaking of rectilinear oscillating movement most of the rollers of the inker are partaking of rotary oscillating movement. This is brought about through a gear drive for the inker which is driven from the oscillating bed rack 2. The gear drive is shown diagrammatically in Figure 4. The rack 2 meshes with a pinion 7, which in turn meshes with a pinion 8. The pinion 8 meshes with a gear 9, which in turn meshes with a pinion 10. The pinion 10 meshes with a gear 11, which in turn meshes with two gears 12 and 13. The pinion 10 also meshes with a gear 14, which in turn meshes with a gear 15. The gear 15 meshes with a pinion 16, which in turn meshes with a gear 17. Thus the gear drive consisting of the eleven gears and pinions just mentioned turns alternately in one direction and the other upon reciprocation of the bed.

Figure 4 also shows diagrammatically the rollers constituting the inker. As above stated, the form rollers 4, 5 and 6 apply the ink to the form. Fresh ink is supplied by a fresh ink supply roll or fountain roll 18 with which a fountain blade 19 cooperates in usual manner. The fountain roll 18 turns only in the counter-clockwise direction viewing Figure 4. As will presently appear, such turning is effected in periodic step-by-step movements. Ink is transferred from the fountain roll 18 alternately in a pair of ductor rollers 20 and 21, which move between the fountain roll and an ink drum 22. Normally, as will presently appear, the ductor rollers 20 and 21 engage successively the fountain roll 18 and ink drum 22, one of the ductor rollers being in engagement with the fountain roll while the other is in engagement with the ink drum and vice versa. In Figure 4 the ductor roller 20 is shown in engagement with the ink drum while the ductor roller 21 is shown in intermediate position out of engagement with both the fountain roll and the ink drum, which will be explained below.

Ink from the ink drum 22 is transferred successively by rollers 23, 24, 25 and 26 to a roller 27. The roller 27 transfers ink to two rollers 28 and 29. The roller 28 transfers ink to the form rollers 4 and 5 and the roller 29 transfers ink to the form roller 6.

Each of the fountain roll 18, the ductor rollers 20 and 21, the ink drum 22, the rollers 23 to 29, inclusive, and the form rollers 4, 5 and 6 has applied thereto substantially centrally thereof in Figure 4 either the letter S or the letter C. These letters are to denote in each case whether the roller is a hard surfaced roller or a soft surfaced roller. Hard surfaced rollers are ordinarily made of steel or cast iron. Soft surfaced rollers are ordinarily made of a gelatinous composition, rubber or some other like material. The hard surfaced rollers are designated by the letter S (for "steel") while the soft surfaced rollers are designated by the letter C (for "composition"). The fountain roll 18, the ink drum 22 and the rollers 24, 26, 28 and 29 are hard surfaced rollers and in the particular embodiment of the invention disclosed are of steel. The ductor rollers 20 and 21, the rollers 23, 25 and 27 and the form rollers 4, 5 and 6 are soft surfaced rollers and in the particular embodiment of the invention disclosed are of composition material. The transfer of ink is at all times alternately from a steel roller to a composition roller and vice versa. The fountain roll 18, the ink drum 22, the roller 24 and the rollers 28 and 29 are positively driven; the other rollers are not positively driven but are driven only by friction with the rollers which contact them (the form rollers 4, 5 and 6, also, of course, engaging and being at least in part frictionally driven by the form). It has already been mentioned that the fountain roll 18 is advanced in periodic step-by-step movements in the counter-clockwise direction only viewing Figure 4. The ink drum 22 is rotatively fixed to the shaft which carries the gear 17 and so is in effect unitary with the gear 17 and turns therewith. The roller 24 is rotatively fixed to the shaft which carries the gear 15 and so is in effect unitary with the gear 15 and turns therewith. The roller 28 is rotatively fixed to the shaft which carries the gear 12 and so is in effect unitary with the gear 12 and turns therewith. The roller 29 is rotatively fixed to the shaft which carries the gear 13 and so is in effect unitary with the gear 13 and turns therewith. Moreover, the rollers 28 and 29 are vibrator rollers, as will presently appear—that is, they vibrate or oscillate axially during operation of the inker. The fountain inker comprises the fountain roll 18, the ductor rollers 20 and 21, the ink drum 22 and the rollers 23 and 24. The vibrator inker comprises the rollers 25, 26, 27, 28 and 29.

The fountain inker is carried by a frame 30 provided with wheels 31 riding upon tracks 32. The tracks 32 are straight and horizontal and extend away from the form rollers and the press. The frame 30 also has downward extensions 33 carrying wheels 34 which lie between the under surfaces of the tracks 32 and lower tracks 35 which die directly below and are parallel to the tracks 32. Thus the fountain inker may be translated toward and away from the press upon the tracks 32 and 35. Tipping of the fountain inker is prevented by the engagement of the wheels 34 between the under surfaces of the tracks 32 and the tracks 35.

Figure 5:
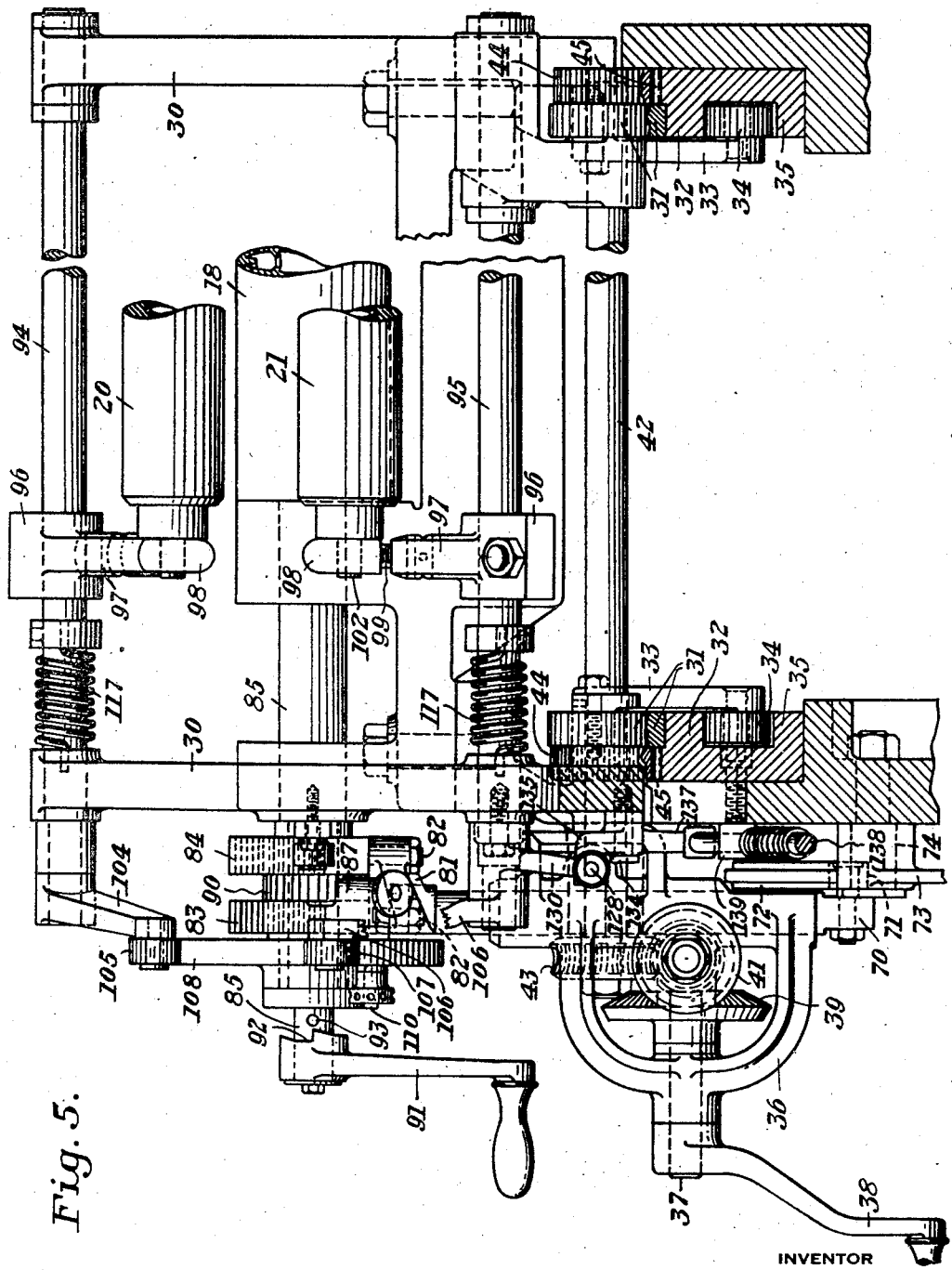
Figure 5 is a vertical transverse cross-sectional view through the inker taken in the vicinity of the right-hand edge of Figure 2A.
Figure 6:
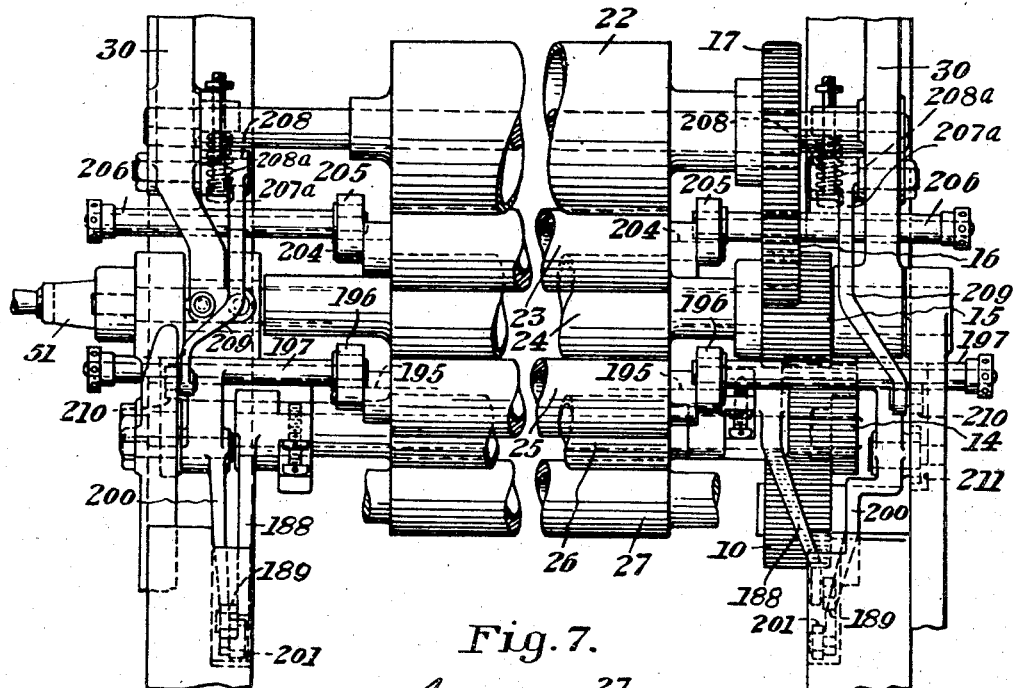
Figure 6 is a fragmentary plan view of the left-hand portion of the inker viewing Figure 1.

The frame 30 has a bracket 36 in which is journaled a stub shaft 37 having a handle 38 fixed to its outer end and a bevel gear 39 fixed to its inner end. Journaled in the frame 30 is a worm 40 which carries unitarily and coaxially therewith a bevel pinion 41 meshing with the bevel gear 39. The shaft 42 which carries certain of the wheels 31 has fixed thereto a worm wheel 43 meshing with the worm 40. Also fixed to the shaft 42 are a pair of pinions 44 each meshing with a stationary rack 45. The tracks 32 and 35 at each side of the inker may be formed integrally as shown in Figure 5 and the teeth of the corresponding rack 45 may be cut therein, thus avoiding the assembly of a number of separate elements.

The fountain inker may be moved along the tracks 32 and 35 by turning the handle 38, which, through the bevel gear 39 and the bevel pinion 41, turns the form 40, which in turn through the worm wheel 43, the shaft 42, the pinions 44 and the racks 45 causes the frame 30 to move longitudinally.

The vibrator inker is carried by a frame 46 which is pivotally connected to the fountain inker frame 30 by a disengageable pivotal connection. The frame 46 has a generally circular hollow boss 47 having a slot 48 cut therein, such slot when the inker is in inking position extending generally toward the fountain inker. The slot 48 communicates with the central bore 49 of the boss 47, the diameter of the central bore 49 of the boss being greater than the width of the slot 48. The frame 30 carries a shaft 50 having fixed thereto a handle 51 and also having fixed thereto a connecting member 52 in the shape of a cylinder flattened at opposite sides to form parallel plane faces 53. When the vibrator inker is in inking position the fountain inker may be engaged with and disengaged from the vibrator inker upon turning the handle 51 to position the connecting member 52 with its faces 53 horizontal. When the connecting member 52 is thus positioned and the frame 30 is moved away from the frame 46 the connecting member 52 will pass through the slot 48 in the boss 47. When it is desired to lock the fountain inker and vibrator inker together the connecting member 52 is positioned within the boss 47 and turned so that the faces 53 extend transversely of the slot 48, as shown in Figure 1. The boss 47 carries a spring pressed detent 54 cooperating with the shaft 50 when the fountain inker and vibrator inker are locked together as shown in Figure 1 to prevent turning of the connecting member 52 relatively to the boss 47. When it is desired to disengage the fountain inker from the vibrator inker the detent 54 is raised to allow the shaft 50 to turn and such shaft is turned by means of the handle 51 to position the connecting member 52 so that upon movement of the fountain inker away from the vibrator inker the connecting member 52 will pass out of the boss 47 through the slot 48. When the fountain inker is moved by turning the handle 38 the vibrator inker must move therewith if the connection just described is closed. If, however, such connection is open the fountain inker may move alone and may be separated from the vibrator inker, which will remain in inking position.

The frame 46 of the vibrator inker has a pair of extensions 55 each carrying a wheel 56. At their right-hand ends the respective tracks 32 have inclined portions 57 terminating in upwardly open sockets 58. One of the wheels 56 is adapted to ride upon each of the tracks 32. When the vibrator inker is in inking position the parts are as shown in Figure 1 with the wheels 56 in the respective sockets 58. In such position the axis of the shaft 50 is directly above the axis of the wheels 56. If with the fountain inker and vibrator inker connected together as shown in Figure 1 the fountain inker is moved to the left viewing that figure the vibrator inker must move therewith. The boss 47 of the vibrator inker moves directly toward the left in a straight line since such boss is positioned coaxially with the shaft 50 although it is free to turn about the axis of the shaft 50. The respective wheels 56 are initially in the respective sockets 58. Thus the vibrator inker frame 46 at first partakes of turning movement generally about the axis of the wheels 56, although almost as soon as such turning movement begins the wheels 56 begin to be raised out of the sockets 58. As movement of the inker toward the left viewing Figure 1 continues the vibrator inker continues its turning movement and the wheels 56 begin to ride up the inclined portions 57 of the tracks 32. The turning movement of the vibrator inker continues while the wheels 56 are riding up the inclined track portions 57 and when the wheels reach the tops of the inclined track portions they ride upon the horizontal tracks 32. After the wheels 56 have reached the horizontal tracks 32 further movement of the vibrator inker toward the left viewing Figure 1 is straight line translatory movement just as in the case of the fountain inker. The fountain and vibrator inkers are shown in retracted position in Figure 3.

The fountain inker frame 30 has a pair of extensions 59 each having a downwardly turned foot 60 adapted when the inker is in inking position to engage a surface 61 formed on one of the extensions 55. Such engagement assists in maintaining the vibrator inker in position. If the entire inker is to be moved toward the left out of inking position the feet 60 will clear the surfaces 61 immediately upon initiation of such movement. When the entire inker is in inking position the engagement of the feet 60 upon the surfaces 61 tends to hold the vibrator inker firmly in place.

The turning movement of which the vibrator inker partakes in movement into and out of inking position as above explained enables the form rollers and the form to be cleared and rendered accessible for work with a substantial saving in space as compared with the space which would be required if the entire inker moved only by translatory movement. When the vibrator inker turns upwardly it occupies less space in the horizontal direction than when it is down in inking position. Also this turning movement of the vibrator inker enables ready disengagement between the vibrator rollers 28 and 29 and the form rollers 4, 5 and 6 as indicated in Figure 9.

The inker is adapted to be connected with the press by a disengageable connection similar to the disengageable connection between the fountain inker and the vibrator inker. Fastened to the press frame is a bracket 62 which projects toward the left viewing Figures 1, 2B and 3, and has at its extremity a bore 63 which opens generally upwardly and somewhat laterally through a slot 64 whose width is less than the diameter of the bore 63. The vibrator inker frame 46 carries a shaft 65 having fixed thereto a handle 66 and also having fixed thereto a connecting member 67 similar to the connecting member 52. The connecting member 67 is in the shape of a cylinder flattened at its sides to form parallel plane faces 68. When the inker is in inking position it may be engaged with and disengaged from the press upon turning the handle 66 to position the connecting member 67 with its faces 68 so oriented as to allow the connecting member 67 to pass through the slot 64 upon turning movement of the vibrator inker as above described. When it is desired to lock the inker to the press the connecting member 67 is positioned within the bore 63 and turned to the position shown in Figures 1 and 2B so that the connecting member will not pass out through the slot 64.

The bracket 62 carries a spring pressed detent 69 cooperating with the shaft 65 when the inker is locked to the press as shown in Figures 1 and 2B to prevent turning of the connecting member 67 relatively to the bore 63. When it is desired to disengage the inker from the press the detent 69 is raised to allow the shaft 65 to turn and such shaft is turned by means of the handle 66 to position the connecting member 67 so that upon upward and outward turning movement of the vibrator inker the connecting member 67 will pass out of the bore 63 through the slot 64. The vibrator inker can be moved out of inking position only along with the fountain inker and when the fountain inker and vibrator inker are fastened together by the disengageable pivotal connecting means above described. When the connection between the fountain inker and the vibrator inker is open turning of the handle 38 moves the fountain inker only, the vibrator inker remaining in inking position. When, however, the connection between the fountain inker and the vibrator inker is closed and the connection between the vibrator inker and the press is open, turning of the handle 38 moves the entire inker out of inking position, the fountain inker moving with straight line translatory movement and the vibrator inker first partaking of turning movement and thereafter following the fountain inker in straight line translatory movement as above described.

When the fountain inker is separated from the vibrator inker the inker gear drive is separated between the gears 14 and 15 (Figure 4). As the gear 14 is mounted in the vibrator inker frame 46 and the gear 15 is mounted in the fountain inker frame 30 these gears will simply unmesh upon movement of the fountain inker away from the vibrator inker. Similarly when the entire inker is moved away from the cylinder the gear 9 which is carried by the press frame and the pinion 10 which is carried by the vibrator inker frame 46 will unmesh. When the fountain inker and vibrator inker are moved back together the gears 14 and 15 will automatically come into mesh and when the inker is moved back into inking position with respect to the press the gear 9 and pinion 10 will automatically come into mesh.

As mentioned above, the fountain roll 18 is turned in periodic step-by-step movements always in the counter-clockwise direction viewing Figures 1, 2A, 3, 4 and 13. The means for effecting such movement of the fountain roll will now be described. Mounted in the fountain inker frame 30 for generally vertical sliding movement is an operating rod 70 carrying at its lower extremity a laterally projecting roller 71 adapted to be engaged by an oscillatable operating fork 72. The fork 72 forms one arm of a bell crank lever 73 pivoted to an extension of the stationary press frame (or to an independent stationary frame, as desired) at 74. The other arm of the bell crank lever 73 is shown at 75 and extends generally downwardly where it has a pivotal connection at 76 with a connecting rod 77 whose opposite end is pivotally carried by a crank pin 78 carried upon the outer face of a cam 79 fixed to the cam shaft 80. The cam shaft 80 rotates continuously during operation of the press and is driven from the press drive in usual manner by means not shown. Rotation of the cam shaft causes through the connecting rod 77 and the bell crank lever 73 vertical oscillation of the operating rod 70.

The rod 70 carries at its upper extremity a bracket 81 to which are fastened by bolts 82 a pair of opposed generally vertically extending racks 83 and 84 (see particularly Figures 13 and 14). The teeth of the rack 83 face generally toward the teeth of the rack 84 and vice versa, but the racks are laterally offset with respect to each other as shown in Figure 14. The fountain roll 18 is fixed to a shaft 85. Loosely turnable upon the shaft 85 is a pair of operating members 86 (see Figure 15) and 87. Each of the operating members 86 and 87 comprises a pinion segment 88 and a spring pressed pawl 89 offset from each other axially of the shaft 85. The segment 88 of the operating member 86 meshes with the rack 84. The segment 88 of the operating member 87 meshes with the rack 83. Fixed to the shaft 85 intermediate the operating members 86 and 87 is a ratchet 90. Each of the spring pressed pawls 89 is designed to operate the ratchet in the forward or counter-clockwise direction viewing Figure 13 upon movement of its operating member in the counter-clockwise direction about the shaft 85.

When the operating rod 70 moves upwardly the racks 83 and 84 carried thereby move upwardly and because of the intermeshing of the rack teeth with the teeth of the respective pinion segments 88 the respective operating members 86 and 87 both swing downwardly, the operating member 86 moving in the counter-clockwise direction about the shaft 85 and the operating member 87 moving in the clockwise direction about the shaft 85. Upon such movement the pawl 89 of the operating member 86 turns the ratchet 90 one step forward (the amplitude of which step depends upon the throw of the crank pin 78 and may be adjusted by changing the crank throw) and since the ratchet 90 is fixed to the shaft 85 this advances the fountain roll one step in the counter-clockwise direction. In Figure 13 the operating rod 70 is shown at or about its uppermost position. Upon downward movement of the operating rod 70 the operating members 86 and 87 swing generally upwardly, the operating member 86 in the clockwise direction about the shaft 85 and the operating member 87 in the counter-clockwise direction about the shaft 85. Upon such movement the pawl 89 of the operating member 87 engages the ratchet 90 to advance the same and the fountain roll another step forward. Consequently the fountain roll is advanced one step for each movement of the rod 70 in each direction of oscillation or two steps for each cycle of operation of the rod 70 or for each revolution of the cam shaft 80.

One revolution of the cam shaft 80 corresponds to one cycle of the press. The connections are such that during each movement of the press bed and form in each direction of oscillation the fountain roll is advanced one step. Normally the arc of advance of the fountain roll upon each step is approximately half of the arc between the line of contact with the fountain roll of the ductor roller 21 and the line of contact with the fountain roll of the ductor roller 20. The reason for this will presently appear.

Figure 2A:
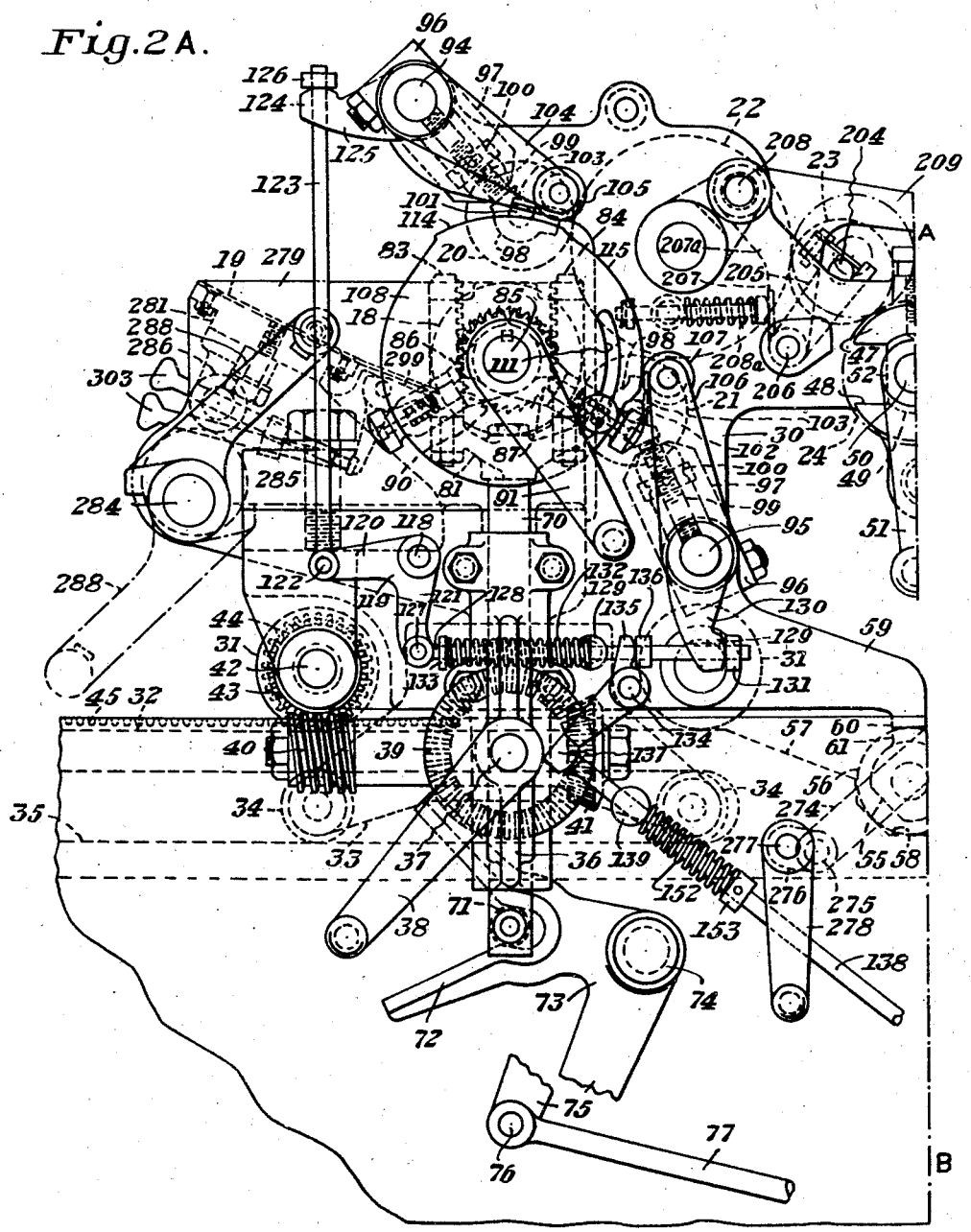

The shaft 85 and the fountain roll 18 may be manually turned in the counter-clockwise direction only viewing Figure 2A by a handle 91. The handle is loosely mounted upon the end of the shaft 85 and has a notch 92 (Figure 5) adapted when the handle is pushed in toward the inker and turned in the counter-clockwise direction to engage a pin 93 projecting radially from the shaft 85 to turn the shaft in the counter-clockwise direction viewing Figure 2A. The handle 91 does not turn the shaft 85 in the clockwise direction as the notch 92 will not engage the pin 93 when the handle is turned in the clockwise direction.

Rotatably carried by the fountain inker frame 30 is a pair of shafts 94 and 95 (Figure 5). Fastened to each of the shafts 94 and 95 at spaced points therealong is a pair of bosses 96 (only one of which on each of said shafts is shown). Each boss 96 has integral therewith an arm 97 carrying a bearing member 98. Each bearing member 98 has a threaded stem 99 which cooperates with an adjusting nut 100 in the corresponding arm 97 so that the effective length of the arm including the bearing member may be adjusted as desired. The bearing members 98 carried by the arms 97 on the shaft 94 rotatably receive the ends of a shaft 101 carrying the ductor roller 20. The bearing members 98 carried by the arms 97 on the shaft 95 rotatably receive the ends of a shaft 102 carrying the ductor roller 21. Thus each of the ductor rollers 20 and 21 is mounted for swinging movement about the axis of the shaft upon which it is mounted and is adjustable toward and away from such axis. Each of the bearing members 98 is of generally U shape to rotatably receive the end of the ductor roller shaft, which shaft end is maintained in place in the bearing member by a cover plate 103.

Fixed to the shaft 94 is a follower arm 104 rotatably carrying at its extremity a cam following roller 105. Fixed to the shaft 95 is a follower arm 106 rotatably carrying at its extremity a cam following roller 107. The rollers 105 and 107 are disposed in the same vertical plane and are adapted to cooperate with a cam 108 which is oscillatable with the operating member 87 (see Figures 13 and 14). The operating member 87 has a threaded bore 109 receiving a set screw 110. Such set screw passes through an arcuate adjusting opening 111 in the cam 108. Thus the cam 108 may be fastened to the operating member 87 in any desired angularly adjusted position within the limits of the slot 111. The operating member 87 has a bearing extension 112 coaxial with the shaft 85 and the cam 108 has a hub 113 fitting upon said bearing extension 112. Thus upon oscillation of the operating member 87 the cam 108 is oscillated about the shaft 85.

The cam 108 has a high portion 114 and a low portion 115. The remainder 116 of the periphery of the cam has no function. The high portion 114 of the cam 108 is adapted to cooperate with the roller 105 and the low portion 115 is adapted to cooperate with the roller 107. When each of the ductor rollers 20 and 21 is in its extreme upper position in engagement with the ink drum 22 its corresponding cam following roller 105 or 107, as the case may be, is moved away from the cam 108 and does not contact such cam. The cam 108 becomes operative only when one or the other of the ductor rollers is moved toward the fountain roll 18.

When the ductor roller 20 is moved toward the fountain roll 18 it may engage the fountain roll except when the roller 105 contacts the high portion 114 of the cam 108. Similarly when the ductor roller 21 is moved toward the fountain roll 18 it may engage the fountain roll except when the roller 107 contacts the low portion 115 of the cam 108. Thus the function of the cam 108 is to determine, depending upon its angular adjustment, the extent of engagement of each of the ductor rollers 20 and 21 with the fountain roll upon each cycle of the press and inker. The cam 108 may be adjusted so that each ductor roller may engage the fountain roll throughout the entire time when it is moved toward the fountain roll or so that each ductor roller will not be permitted to engage the fountain roll at all. It may, of course, also be adjusted at any intermediate point.

As the cam 108 is shown adjusted in Figure 2A the ductor rollers 20 and 21 are permitted to engage the fountain roll 18 throughout the greater portion of the time during which the ductor rollers are moved toward the fountain roll—approximately 85% to 90% of such time. The cam 108 in Figure 2A has been turned substantially to its extreme position in its oscillatory turning movement in the clockwise direction viewing such figure and is ready for its return movement in the counter-clockwise direction. During such return movement the ductor roller 20 will engage the ink drum 22, as shown. Since the roller 107 is in contact with the low portion 115 of the cam 108 the ductor roller 21 is temporarily held out of contact with the fountain roll, as shown. However, after the cam 108 has turned through but a few degrees the roller 107 will ride off of the cam portion 115, permitting the ductor roller 21 to engage the fountain roll from that time until approximately the end of the turning movement of the cam 108 in the counter-clockwise direction, at which time the ductor roller 21 is swung up to contact the ink drum 22 and the ductor roller 20 is swung down to contact the fountain roll 18. Upon the turning movement of the cam 108 in the clockwise direction viewing Figure 2A the ductor roller 21 is in contact with the ink drum 22 and the ductor roller 20 is initially in contact with the fountain roll 18. Toward the end of such movement, however, the roller 105 rolls up on the high portion 114 of the cam 108 which raises the ductor roller 20 to a position out of contact with the fountain roll 18.

The purpose of the cam 108 is, of course, to enable determination as desired of the amount of fresh ink delivered from the fountain roll to the ink drum. The adjusting means for making this determination is very simple indeed, it merely being necessary to loosen the set screw 110 and turn the cam 108 through a small angle relatively to the operating member 87 and then tighten up the set screw 110.

Surrounding each of the shafts 94 and 95 and having one end connected with the frame 30 is a coil spring 117 (Figure 5). These coil springs normally urge both ductor rollers 20 and 21 toward the fountain roll 18. Consequently, when the ductor rollers are not positively moved or held away from the fountain roll 18 they move toward and into engagement therewith. As has been explained above, the cam 108 may at times be effective for holding the ductor rollers out of engagement with the fountain roll. However, the cam 108 does not move the ductor rollers into engagement with the ink drum 22. The means for so doing will now be described.

Pivotally mounted upon the frame 30 at 118 is a bell crank lever 119 having a generally horizontal arm 120 and a generally vertical arm 121. Pivoted to the arm 120 at 122 is a rod 123 which passes loosely through a bore 124 in an arm 125 fixed to the shaft 94. A nut 126 is applied to the upper end of the rod 123 so that upon downward movement of the rod 128 it will turn the shaft 94 in the counter-clockwise direction viewing Figure 2A and thereby swing the upper arm 97 in the counter-clockwise direction about the axis of the shaft 94 to move the ductor roller 20 generally upwardly toward the ink drum. When the rod 123 is in its upward position it has no effect upon the shaft 94 or the ductor roller 20, the ductor roller at such time being urged toward the fountain roll 18 by the spring 117 on the shaft 94.

Pivoted to the generally vertical arm 121 of the bell crank lever 119 at 127 is a rod 128 which passes through a stud 129 carried by the frame 30. The rod 128 also passes loosely through a bore 129 in an arm 130 fixed to the shaft 95. A nut 131 is applied to the right-hand end of the rod 128 viewing Figure 2A so that upon movement of the rod 128 toward the left viewing such figure it will turn the shaft 95 in the clockwise direction viewing Figure 2A thereby swinging the lower arm 97 in the clockwise direction about the axis of the shaft 95 to move the ductor roller 21 toward the ink drum. When the rod 128 is in its right-hand position viewing Figure 2A it has no effect upon the shaft 95 or the ductor roller 21, the ductor roller at such time being urged toward the fountain roll 18 by the spring 117 on the shaft 95.

A coil spring 132 surrounds the rod 128 and bears between a collar 133 fastened to such rod and the stud 129 whereby normally to urge the rod 128 toward the left viewing Figure 2A. The spring 132 is stronger than the spring 117 on the shaft 95 so that when the spring 132 is allowed to act fully upon the rod 128 to move the same toward the left viewing Figure 2A it will cause the shaft 95 to be turned to swing the ductor roller 21 upwardly into contact with the ink drum 22.

Mounted for turning movement in the frame 30 is a generally horizontal transverse shaft 134. Fixed to such shaft is an arm 135 adapted to engage a collar 136 fixed to the rod 128. Also fixed to the shaft 134 is an arm 137 adapted to bear against the upper end of a rod 138 which passes through a stud 139 connected with the frame 30 and the lower end of which is pivoted at 140 to the lower arm 141 of a bell crank lever X mounted for rotation upon a stub shaft 146 in the stationary press frame. The upper arm of the bell crank lever X is shown at 142. Pivoted to the arm 142 of the bell crank lever X at 143 is a bell crank lever Y having a lower arm 144 and an upper arm 145. Also mounted for rotation upon the stub shaft 146 is a third bell crank lever Z having a long arm 147 and a shorter arm 148. The arm 147 carries a cam following roller 149 which follows a cam 150 fixed to the cam shaft 80 and which of course rotates therewith. The roller 149 is maintained constantly in engagement with the cam 150 by a tension spring 151 acting between the arm 148 and the stationary press frame. Also the rod 138 is normally urged downwardly by a coil spring 152 acting between a collar 153 fixed to the rod 138 and the stud 139. The bell crank lever Y is normally urged to turn in the counter-clockwise direction viewing Figure 1 about its pivot 143 on the arm 142 of the bell crank lever X by a tension coil spring 154 acting between the arm 144 of the bell crank lever Y and the arm 142 of the bell crank lever X. The arm 144 has a recess 155 at its lower end adapted normally to engage the arm 148 of the bell crank lever Z as shown in Figure 1.

When the bell crank levers X, Y and Z are in the relative positions shown in Figure 1 they act as a unit—that is, as though they were all formed as a single unitary member. Under such circumstances the arms 141 and 147 may be considered as fixed relatively to each other, so the cam 150 causes the arm 147 and hence the arm 141 to oscillate, which oscillatory movement is transmitted through the rod 138 to the arm 137 and thence through the shaft 134 to the arm 135. When the rod 138 is in its downward position the spring 132 moves the rod 128 to the left, thus allowing the spring 117 on the shaft 94 to move the ductor roller 20 toward the fountain roll 18 and moving the ductor roller 21 against the action of the spring 117 on the shaft 95 up into contact with the ink drum 22. When the rod 138 is moved up it pushes the arm 137 generally upwardly and toward the left, which in turn moves the arm 135 generally toward the right and releases the arm 130 so that the spring 117 on the shaft 95 moves the ductor roller 21 toward the fountain roll 18. At the same time the rod 128 moves downwardly and swings the ductor roller 20 up into contact with the ink drum 22.

Thus each of the ductor rollers 20 and 21 is continually swung back and forth between the fountain roll and the ink drum during operation of the press. The ductor rollers move in opposite directions so that when one of them is in contact with the ink drum the other is either in contact with the fountain roll or held out of such contact by the cam 108. As the ductor rollers are shown in Figures 1, 2A and 4, the ductor roller 20 is in contact with the ink drum and the ductor roller 21 would be in contact with the fountain roll except that as the cam 108 is at the extreme clockwise limit of its oscillatory turning movement the roller 107 is upon the low portion 115 of the cam 108 to hold the ductor roller 21 out of contact with the fountain roll 18. The operating mechanism is synchronized so that the fountain roll advances one step while each of the ductor rollers is either in contact therewith or held out of such contact by the cam 108. To illustrate how the ductor rollers take ink from the fountain roll the extreme condition will be assumed in which the cam 108 is rendered completely inoperative so that whenever each of the ductor rollers 20 and 21 is moved toward the fountain roll 18 it will contact the fountain roll.

As mentioned above, the arc of advance of the fountain roll at each step is approximately one-half the arc between the line of contact with the fountain roll of the ductor roller 21 and the line of contact with the fountain roll of the ductor roller 20. Now let it be assumed that the ductor roller 21 has just taken ink from the fountain roll. This means that a portion of the surface of the fountain roll extending up from the line of contact therewith of the ductor roller 21 about halfway to the line of contact with the fountain roll of the ductor roller 20 has been engaged by the ductor roller 21 to remove fresh ink therefrom. The next step in the cycle is for the ductor roller 20 to move down into engagement with the fountain roll and while the ductor roller 20 is in such engagement the fountain roll advances one step. Upon such advance the ductor roller 20 rolls over a portion of the surface of the fountain roll which had not been rolled over by the ductor roller 21 and removes ink therefrom. However, at the end of the period of contact of the ductor roller 20 with the fountain roll the portion of the surface of the fountain roll which had previously been rolled over by the ductor roller 21 will have progressed practically to the line of contact between the ductor roller 20 and the fountain roll. During the succeeding period of engagement of the ductor roller 21 with the fountain roll the portion of the surface of the fountain roll which had previously been rolled over by the ductor roller 21 passes beneath the ductor roller 20 while the latter is away from the fountain roll and in contact with the ink drum. Thus by the particular arrangement and synchronization of the parts the ductor rollers take fresh ink alternately from the fountain roll, but each ductor roller always engages a portion of the surface of the fountain roll which had not previously been engaged by the other ductor roller since passing of such portion of the surface of the fountain roll through the ink fountain to receive a new coating of fresh ink.

The printing cylinder 3 during normal operation of the press continues always to rotate in the counter-clockwise direction viewing Figure 1 but upon each cycle of the press moves up out of contact with the form upon the reverse movement of the form toward the left viewing Figure 1 and moves down into cooperative relationship with the form upon the printing stroke when the form moves toward the right viewing Figure 1. Such up and down movement of the cylinder is caused by up and down movement of a rod 156 which is pivoted at 157 to an eccentric 158 in which the cylinder shaft 159 is mounted. At its lower end the rod 156 carries an eccentric strap 160 surrounding an eccentric 161 carried by an angularly oscillated shaft 162. Projecting from the end of the shaft 162 is a pin 163. Pivoted to the stationary press frame at 164 is a bell crank lever 165 having a generally horizontal arm 166 and a generally downwardly extending arm 167. The arm 167 is adapted to be contacted by the pin 163 upon turning of the shaft 162, as will presently be explained. The arm 166 of the bell crank lever 165 has a notch 168 for receiving the upper extremity of the arm 145 of the bell crank lever Y when the arm 166 is in its lowermost position as indicated by solid lines in Figure 1. When the arm 166 is in its uppermost position as indicated by dotted lines in Figure 1 the arm 145 of the bell crank lever Y is free to oscillate with the bell crank levers X and Z without interference.

When the press is running normally the shaft 162 oscillates back and forth in angular turning movement. The turning movement of such shaft is so synchronized with the press drive that when the bed is moving forwardly on the impression stroke the cylinder is lowered and when the bed is moving in its reverse stroke the cylinder is raised. When a sheet does not register to the press control mechanism of known character functions to stop the movement of the shaft 162 in the position it assumes at the end of its oscillatory movement in the counter-clockwise direction viewing Figure 1, this being the position in which the shaft is shown in that figure. When the shaft 162 is in the position mentioned the printing cylinder 3 is in the up or inoperative position as shown in Figure 1. Also the pin 163 is in the solid line position of Figure 1.

When the follower 149 is upon the high portion of cam 150 as shown in Figure 1, and when the levers X, Y and Z are in the cooperative relationship shown in Figure 1 so that they in effect oscillate as a single unitary member, the arm 145 of the lever Y is positioned just to the right of the notch or shoulder 168 of the arm 166 of the bell crank lever 165 as shown in solid lines in Figure 1. Likewise when the pin 163 is in the solid line position of Figure 1 the arm 166 is in its lower or solid line position as shown in that figure. In such position the portion of the arm 166 to the right of the shoulder 168 viewing Figure 1 rests upon the top surface of the arm 145 as shown.

The parts being in the position shown in Figure 1, when the shaft 162 turns in the clockwise direction during its oscillatory movement the pin 163 moves generally toward the right and downwardly also turning in the clockwise direction about the center of the shaft 162 from the full line position of Figure 1 to the dotted line position of that figure. But after the shaft 162 has turned through only a portion of its clockwise oscillatory movement the pin 163 pushes the arm 167 of the bell crank lever 165 generally toward the right from its solid line position to its dotted line position in Figure 1, which results in raising the arm 166 of the same bell crank lever from its solid line position to its dotted line position in which the lower surface of the portion of the arm 166 to the left of the shoulder 168 is raised to a height or elevation slightly above the top surface of the arm 145. At about the time the arm 166 has thus been raised so that the lower surface of the portion of such arm to the left of the shoulder 168 is raised to a height slightly above the top surface of the arm 145 the follower 149 rides down onto the low portion of the cam 150. Since the arm 166 in its raised position offers no obstruction to movement toward the left viewing Figure 1 of the upper extremity of the arm 145 the assembly comprising the levers X, Y and Z turns as a unit in the counter-clockwise direction about the axis of the shaft 146, the upper portion of the arm 145 moving to a position beneath the portion of the arm 166 to the left of the shoulder 168. Thus when the pin 163 reaches the dotted line position in Figure 1 and has parted contact with the arm 167 the arm 166 will simply rest upon the top surface of the arm 145, the latter being positioned beneath the portion of the arm 166 to the left of the shoulder 168. Upon the oscillatory movement of the shaft 162 in the counter-clockwise direction viewing Figure 1 the pin 163 moves from the dotted line to the solid line position. Likewise the follower 149 again rides up onto the high part of the cam 150. This results in swinging of the arm 145 toward the right or in the clockwise direction about the axis of the shaft 146 viewing Figure 1 until the upper end of the arm 145 just passes the shoulder 168. At such time the pin 163 will have approximately reached its full line position viewing Figure 1 and the arm 166 will fall by gravity from the dotted line to the solid line position viewing that figure.

As long as sheets are being successively registered to the drop guides of the press cylinder upon successive printing strokes of the bed the cycle above described continues indefinitely. The levers X, Y and Z under such circumstances always function as though they were a single unit and the rod 138 is oscillated axially to swing the ductor rollers back and forth in the manner above explained. When, however, a sheet does not register to the press the control mechanism above mentioned functions to stop the oscillatory movement of the shaft 162 with the pin 163 in the solid line position as shown in Figure 1. Such control mechanism is shown in copending application Serial No. 324,474. When the shaft 162 stops in the position shown in Figure 1 and remains in that position the arm 166 is not lifted as above described. Consequently when the follower 149 next rides from the high to the low portion of the cam 150 the upper extremity of the arm 145 cannot move to the left, being held against such movement by the shoulder 168. This results in unlatching of the arm 144 from the arm 148 and swinging movement of the bell crank lever Y generally in the clockwise direction about the upper extremity of its arm 145 as a pivot. This is brought about by the spring 152, which when the follower 149 rides down onto the low portion of the cam 150 turns the bell crank lever X in the counter-clockwise direction about the axis of the shaft 146. But since the pivotal connection 143 between the bell crank lever Y and the arm 142 of the bell crank lever X is on such arm 142 this results in the swinging of the lever Y as a whole generally toward the left as above explained. The arm 144 unlatches from the arm 148 and the turning movement continues until the arm 144 strikes the stop 169 which projects into the path of the arm 144 from an extension 170 on the arm 142. When the parts are in such position the rod 138 will be in an intermediate position—about halfway between its extreme upper and its extreme lower position. When the rod 138 is so positioned the ductor rollers 20 and 21 will likewise be in intermediate positions, each about halfway between the fountain roll 18 and the ink drum 22. Thus upon tripping of the press, which results when no sheet registers thereto, the ductor rollers are brought to a stationary position out of contact with both the fountain roll and the ink drum. If with the parts in such position the cam shaft 80 and the cam 150 rotate the bell crank lever Z will simply oscillate alone without function, the bell crank levers X and Y remaining in fixed position with the arm 144 against the stop 169.

When the shaft 162 resumes its oscillatory turning movement the pin 163 acts on the arm 167 as above explained, raising the arm 166 and allowing the arm 145 to move toward the left from the position shown in Figure 1 and the arm 144 thereupon automatically latches to the arm 148 and the levers X, Y and Z resume their cooperative position as shown in Figure 1 and the operative cycle above explained is again commenced.

It has been explained above how the ductor rollers are swung back and forth alternately between the fountain roll and the ink drum and so that when one ductor roller is in cooperative relationship with the fountain roll the other is in contact with the ink drum. The parts are so synchronized that upon the reverse movement of the bed from its extreme right-hand position as shown in Figure 4 to its left-hand position (during which movement the cylinder is raised to inoperative position) the ductor roller 20 is in contact with the ink drum 22 as shown in Figure 4. When the bed is moving toward the left viewing Figure 4 the ink drum 22 is turning in the counter-clockwise direction viewing that figure, as will be seen upon analysis of the gearing shown in that same figure. When the ductor roller 20 swings over into contact with the ink drum it carries with it a quantity of fresh ink which it has taken from the fountain roll 18 upon the immediately preceding oscillatory movement of the bed on the printing stroke. This fresh ink is delivered by the ductor roller 20 to the ink drum 22 and from the ink drum it is delivered down through the other rolls shown in Figure 4 which comprise transfer mechanism. Such transfer mechanism delivers the ink to the form rollers 4, 5 and 6.

The ink delivered from the ductor roller 20 to the ink drum 22 during movement of the bed from right to left viewing Figure 4 traverses a known path of predetermined length between its point of application to the ink drum and its point of application by the form rollers to the form. Such ink travels with the ink drum 22 counter-clockwisely until it is taken off of the ink drum by the roller 23. It travels with the roller 23 clockwisely to the roller 24, travels with such roller counter-clockwisely to the roller 25, travels with such roller clockwisely to the roller 26, travels with such roller counter-clockwisely to the roller 27, travels with such roller clockwisely to the vibrator rollers 28 and 29 and travels with the vibrator roller 28 counter-clockwisely to the form rollers 4 and 5 and with the vibrator roller 29 counter-clockwisely to the form roller 6.

The length of the path of travel of the fresh ink through the inker from its point of application to the ink drum is such that when the bed reaches its extreme left-hand position viewing Figure 4 such fresh ink which at the beginning of the stroke of the bed toward the left was just being applied by the ductor roller 20 to the ink drum has reached approximately the point of application to the form. In other words, such fresh ink which has been moving down through the transfer means while the bed and form have been moving toward the left reaches the form rollers at approximately the end of such movement and as the form rollers stop their clockwise rotation such ink has moved down upon the right-hand halves of the form rollers viewing Figure 4 until it has approximately reached the form. This is only an approximate condition but it is sufficiently close to an exact condition that the results obtained are highly satisfactory. The fresh ink at the end of the reverse stroke of the bed may have just reached the form or it may almost but not quite have reached the form or it may have reached the form very shortly before the end of the bed movement. The point is that at the end of the reverse movement of the bed the inker is charged throughout with fresh ink ready to be applied to the form upon the immediately succeeding printing stroke when the bed and form move from left to right viewing Figure 4.

Upon the succeeding printing stroke when the form moves from left to right the fresh ink with which the inker is charged and which is ready for immediate application to the form as soon as the forward motion thereof commences is applied to the form. At the time the application of such ink to the form commences the ductor roller 21 swings into contact with the ink drum 22. This ductor roller has upon the previous reverse movement of the bed and form received fresh ink from the fountain roll 18. As the bed moves toward the right the ink delivered by the ductor roller 21 travels with the ink drum 22 clockwisely to the roller 23, travels with such roller counter-clockwisely to the roller 24, travels with such roller clockwisely to the roller 25, travels with such roller counter-clockwisely to the roller 26, travels with such roller clockwisely to the roller 27, travels with such roller counter-clockwisely to the vibrator rollers 28 and 29 and travels with the vibrator roller 28 clockwisely to the form rollers 4 and 5 and with the vibrator roller 29 clockwisely to the form roller 6.

The length of the path of travel of the fresh ink through the inker from its point of application to the ink drum is such that when the bed reaches its extreme right-hand position viewing Figure 4 such fresh ink which at the beginning of the stroke of the bed toward the right was just being applied by the ductor roller 21 to the ink drum has reached approximately the point of application to the form. In other words, such fresh ink which has been moving down through the transfer means while the bed and form have been moving toward the right reaches the form rollers at approximately the end of such movement and as the form rollers stop their counterclockwise rotation such ink has moved down upon the left-hand halves of the form rollers viewing Figure 4 until it has approximately reached the form.

Thus upon each movement of the bed in each direction fresh ink is applied to the form and at the same time as such ink is being applied a new batch of fresh ink is being delivered down through the inker to be available for application immediately at the beginning of the succeeding oscillatory movement of the form in the opposite direction. Thereby fresh ink is applied to the form twice per cycle of the press. This is not merely a re-rubbing of the form with the same ink which was applied to it upon the preceding stroke but the ink on the form rollers is augmented with new fresh ink upon each movement of the bed in each direction. This is an extremely important feature in printing.

It will be appreciated that the paths of movement of the fresh ink from the respective ductor rollers to the respective form rollers are not all of exactly the same length. There are six such paths, one from each of the ductor rollers 20 and 21 to each of the form rollers 4, 5 and 6, as explained above. The result is that in each direction of movement of the bed the fresh ink will not be applied to the form by all three form rollers at exactly the same time. However, the paths are of sufficiently uniform length to accomplish my purpose. Also it is to be noted that on a movement of the bed from left to right viewing Figure 4 the form first moves under the form roller 4, then under the form roller 5 and then under the form roller 6 so that it is not critical if the fresh ink does not reach the form rollers 5 and 6 in the same relationship thereto as the fresh ink reaches the form roller 4 since the form rollers 5 and 6 partake of some rotative movement after the fresh ink has reached them before the form contacts them. The same condition obtains in reverse when the bed moves from right to left viewing Figure 4. The movement of the bed is such that when it is at the left-hand end of its stroke viewing Figure 4 the right-hand edge of the form is very slightly to the left of a vertical plane containing the axis of the form roller 4 and when the bed is at the right-hand end of its stroke viewing Figure 4 the left-hand edge of the form is very slightly to the right of a vertical plane containing the axis of the form roller 6.

Means are provided for separating the composition rollers from the steel rollers when the inker is moved to inoperative position. Referring first to Figures 1, 2B and 3, as already explained, when the fountain inker and vibrator inker are moved together out of operative or inking position the fountain inker moves in a straight line horizontally and the vibrator inker first turns upwardly and outwardly and then follows the fountain inker in a straight line movement. The upward and outward turning movement of the vibrator inker separates the steel vibrator rollers 28 and 29 from the composition form rollers 4, 5 and 6 since the form rollers remain in place and the vibrator rollers are a part of the vibrator inker.

The composition roller 27 is mounted upon a shaft 171 whose ends are carried in brackets 172 fixed to a shaft 173. The shaft 173 is carried by arms 174 fixed to a shaft 175 rotatably carried by the vibrator inker frame 46. Fixed to the shaft 175 is a pair of arms 176 each having at its outer extremity a cam following roller 177. Each roller 177 is adapted to cooperate with a recess 178 in the press frame. Each arm 176 has a protuberance 179 against which a compression coil spring 180 presses. Each spring 180 is coiled about a pin 181 passing through a bore in a boss 182 on the vibrator inker frame 46. Each pin 181 is headed at 183 and adjacent its opposite extremity a cross pin 184 passes therethrough. Thus each spring 180 tends always to swing the corresponding arm 176 in the clockwise direction about the axis of the shaft 175. When the rollers 177 are not engaged in the recesses 178 the springs 180 become effective to turn the shaft 175 in the clockwise direction and thereby separate the composition roller 27 from the steel rollers 28 and 29. Stop means (not shown) is provided for limiting the turning movement of the shaft 175 under the action of the springs 180. When the inker is moved into inking position the rollers 177 enter the recesses 178 in the press frame which act as cams to turn the shaft 175 in the counter-clockwise direction sufficiently to bring the composition roller 27 into contact with the steel vibrator rollers 28 and 29.

Means are also provided for separating the steel roller 26 from the composition roller 27 when the inker is moved out of inking position. The roller 26 is mounted upon a shaft 185 whose ends are carried in brackets 186 pivotally mounted upon a shaft 187 carried by the frame 46. Also pivotally carried by the shaft 187 is a pair of arms 188 each having at its outer extremity a cam following roller 189. Each of the arms 188 also carries a projection 190 and each of the brackets 186 has a bifurcated end providing opposed portions 191 in which are mounted adjusting screws 192 which engage the projection 190 at opposite faces thereof so that upon adjustment of the adjusting screws 192 the angular positions of the brackets 186 relatively to the arms 188 may be adjusted. The rollers 189 respectively cooperate with recesses 193 in the press frame in a manner similar to that in which the rollers 177 cooperate with the recesses 178. A compression coil spring 194 mounted similarly to the springs 180 cooperates with each of the arms 188 tending normally to turn the same in the clockwise direction about the axis of the shaft 187 whereby to separate the steel roller 26 from the composition roller 27 when the rollers 189 are out of the recesses 193. When the inker is moved into inking position the rollers 189 enter the recesses 193 and turn the arms 188 in the counter-clockwise direction about the axis of the shaft 187 viewing Figure 3 and against the action of the compression coil spring 194 to bring the steel roller 26 into engagement with the composition roller 27. This movement of the steel roller 26 also moves such roller into and out of engagement with the composition roller 25.

The composition roller 25 is mounted upon a shaft 195 whose ends are carried in brackets 196 fixed to a shaft 197. The shaft 197 is carried by arms 198 fixed to a shaft 199 rotatably carried by the vibrator inker frame 46. Fixed to the shaft 199 is a pair of arms 200 each having at its outer extremity a cam following roller 201. Each roller 201 is adapted to cooperate with a recess 202 in the press frame. Each arm 200 has a protuberance 202a against which a compression coil spring 203 presses to normally turn the shaft 199 in the clockwise direction viewing Figure 3. Each spring 203 is mounted similarly to the springs 180 and 194 and operates in the same manner. Thus when the rollers 201 are out of the recesses 202 the springs 203 turn the shaft 199 to separate the composition roller 25 from the steel rollers 24 and 26. Upon movement of the inker to inking position the rollers 201 enter the recesses 202 which cause the composition roller 25 to move into operative position in engagement with the steel rollers 24 and 26.

The composition roller 23 is mounted upon a shaft 204 whose ends are carried in brackets 205 fixed to a shaft 206. The shaft 206 is carried by arms 207 of bell crank levers 207a fixed to a shaft 208 rotatably carried by the vibrator inker frame 30. Each bell crank lever 207a also has an arm 209 having at its outer extremity a cam following roller 210. The rollers 210 are adapted to cooperate with recesses or slots 211 in the frame 46. When the entire inker is moved out of inking position together the rollers 210 move along the slots 211 to raise the composition roller 23 out of contact with the steel roller 24 and the ink drum 22. Springs 208a acting respectively against the arms 207 of the bell crank lever 207a are provided normally urging the arms 209 upwardly viewing Figure 3. These springs have no function when the fountain inker and vibrator inker are connected together since at such times the rollers 210 are always positioned within the slots 211 but do function to raise the arms 209 a distance determined by a suitable stop (not shown) to raise the composition roller 23 out of contact with the steel roller 24 and the ink drum 22 when the fountain inker is moved away from the vibrator inker while the latter remains in inking position.

Thus the composition rollers of whatever portion of the inker is moved out of inking position are separated from the steel rollers with which they normally contact upon movement of such portion of the inker out of inking position. If the fountain inker only is moved out of inking position the composition roller 23 is separated from the steel roller 24 and the ink drum 22. If the entire inker is moved out of inking position the composition roller 23 is separated from the steel roller 24 and the ink drum 22 and also the composition rollers 25 and 27 are separated from the respective steel rollers with which they normally are in contact when the inker is in operation. All of the rollers mentioned are automatically brought back into their cooperative relationship in proper contact with one another to deliver ink when the inker or whatever portion thereof may have been moved out of inking position is returned to such position. This separation and return of the rollers is effected entirely automatically without the necessity of the operator giving the matter any thought whatever. The engageable and disengageable connections afforded by the cam following rollers and the respective recesses or slots with which they cooperate provide a simple, convenient and effective means for controlling the rollers.

As stated above, the vibrator rollers 28 and 29 are positively driven through their gears 12 and 13, respectively, which mesh with and are driven by the gear 11. It has also been mentioned that the vibrator rollers 28 and 29 vibrate or oscillate axially during operation of the inker. The vibration of these rollers is such that while one is moving in one direction the other is moving in the opposite direction and both rollers are in their central position simultaneously—that is, their centers pass each other at the longitudinal center line of the inker.

Figure 7:
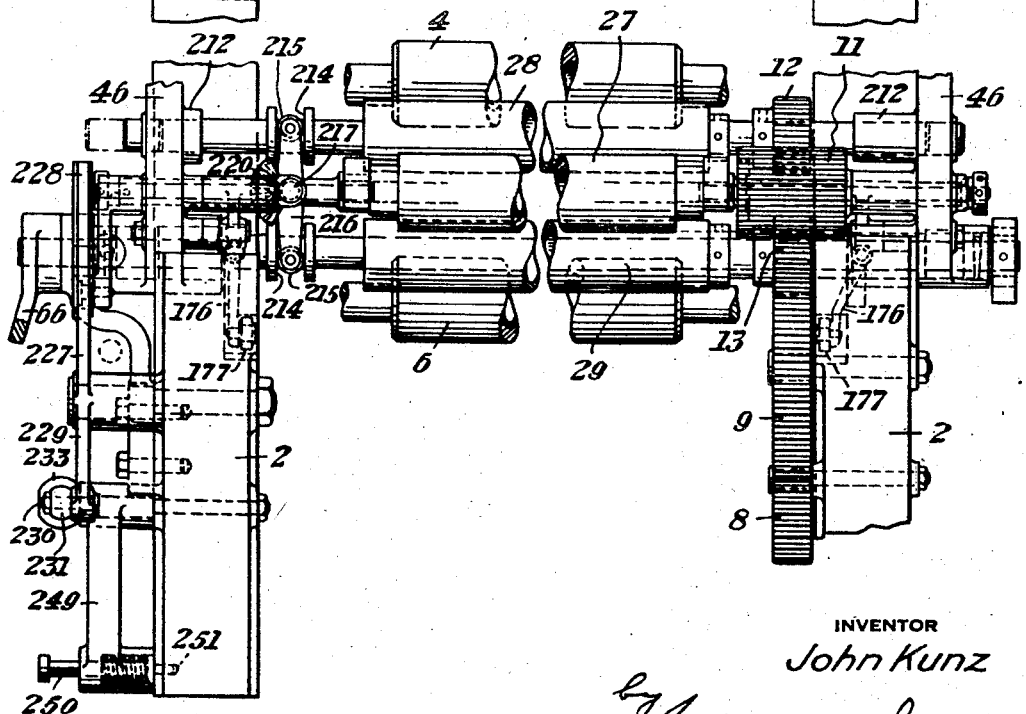
Figure 7 is a fragmentary plan view of the right-hand portion of the inker viewing Figure 1 with the left-hand portion moved out of the way.

Each of the vibrator rollers 28 and 29 is rotatably mounted in bearings 212 in the frame 46. These bearings, as shown in Figure 7, position the vibrator rollers for rotation about their respective axes but allow for vibration thereof. Each of the vibrator rollers has end shaft portions 213 passing within the bearings 212 for that roller. The gears 12 and 13 are fixed to the respective shafts and such gears partake of vibratory movement with their respective rollers. The gear 11 is elongated axially, as shown in Figure 7, so that during the vibratory movement of the vibrator rollers 28 and 29 their respective gears 12 and 13 will always remain in mesh with the gear 11.

Each of the vibrator rollers 28 and 29 has a circular cam groove 214 within which is disposed a roller 215. The respective rollers 215 are rotatably mounted on the opposite ends of a lever 216 pivoted at 217 to the frame 46 and having integral therewith a bevel gear 218 (Figure 12). A stub shaft 219 is mounted in the frame 46 and carries at one end a bevel pinion 220 meshing with the bevel gear 218. At its other end the stub shaft 219 carries a spur pinion segment 221 meshing with a spur gear segment 222 pivoted to the frame 46 at 223 and having an arm 224 extending generally downwardly and longitudinally of the inker and carrying at its extremity a roller 225. Means presently to be described is provided for oscillatably swinging the arm 224 about the axis of the shaft 223 whereby to oscillate the gear segment 222 and hence through the pinion segment 221, the bevel pinion 220 and the bevel gear 218 to oscillate the lever 216 about its pivot 217. Since the rollers 215 are in the circular cam grooves 214 of the vibrator rollers this oscillatory movement causes lengthwise oscillation or vibration of the vibrator rollers 28 and 29.

Mounted in the press frame is a stub shaft 226 to which is fixed an arm 227 having at its extremity a fork 228 adapted to receive the roller 225, as shown in Figures 1 and 2B. The shaft 226 is adapted to oscillate, such oscillation being imparted to the fork 228 and through it to the roller 225 and the arm 224. The shaft 226 carries an arm 229 which is fixed thereto and which arm 229 has pivoted thereto at its opposite end at 230 a downwardly extending rod 231 carrying at its lower end a roller 232. The rod 231 is guided for generally vertical sliding movement by a guide collar 233 through which the rod passes and which is adapted to be adjustably positioned, as will presently be described. The roller 232 rides within a hollow arm 234 fixed to a shaft 235 mounted in the press frame. Also fixed to the shaft 235 is a generally downwardly extending arm 236 to which is pivoted at its lower extremity at 237 a link 238 pivoted at 239 at its opposite end to the upper end of an arm 240 fixed to a shaft 241, also mounted in the press frame. Also fixed to the shaft 241 is an arm 242 carrying at its extremity a roller 243 which rides within a cam groove 244 of a cam 245 fixed to the cam shaft 80. The shape of the cam groove 244 is such as to cause oscillation of the arm 242 and of the shaft 241, which in turn through the arm 240, the link 238 and the arm 246 causes oscillation of the shaft 235. Since the guide collar 233 is in fixed position, the hollow arm 234 which is fixed to the shaft 235 will when such shaft is oscillated cause generally up and down sliding movement of the rod 231 in the guide collar 233. This movement will, of course, be accompanied by some relative movement longitudinally of the hollow arm 234 between such arm and the roller 232.

If the guide collar 233 is moved toward the right viewing Figure 1 the amplitude of oscillatory movement imparted by the mechanism just described to the shaft 226 will be increased because the roller 232 will then be cooperating with a portion of the hollow arm 234 farther removed from the center of turning 235 of such arm. Such movement of the guide collar 233 is provided for through its being pivotally mounted at 246 upon the lower end of an arm 247 fixed to a shaft 248 in the press frame. Also fixed to the shaft 248 is an arm 249 carrying at its outer extremity a spring pressed pin 250 adapted selectively to enter one of an arcuate series of holes 251 in a plate 252 forming a part of the press frame. The series of holes 251 is arranged in an arc about the center of the shaft 248 and the spring pressed pin 250 may by pulling it out of whichever one of the holes it may be in, turning the arm 249 about the axis of the shaft 248 to another position and allowing the spring to project the pin inwardly, be positioned in any desired one of the holes 251. When the pin 250 is in a hole near the upper end of the arcuate series of holes 251 the guide collar 233 is moved toward the right viewing Figure 1 and the amplitude of oscillation of the shaft 226 is increased. The contrary is true when the pin 250 is in a hole near the bottom of the arcuate series of holes 251. Indeed when the center of the roller 232 lies in the axis of the shaft 235 the shaft 226 will not be oscillated at all despite continued oscillation of the shaft 235.

Thus by a very quick and simple manipulation the amplitude of oscillation or vibration of the vibrator rollers 28 and 29 may be adjusted. The means for vibrating these rollers and the means for adjusting the amplitude of vibration are such that a greater amplitude of vibration is provided for than has been feasible with mechanisms for the same purpose heretofore provided. The motion transmitting mechanism just described is claimed in my copending application Serial No. 415,403.

As will be seen from the above description, the inker has various different operating connections each driven independently from the press drive, such connections being readily separable to permit the inker or a portion thereof to be moved away from the press cylinder and being automatically rendered operative upon movement of the inker to inking position adjacent the press cylinder. The connections are also such that regardless of the positions of the parts when the inker is moved into inking position all of the mechanism of the inker will automatically be timed. The main gear drive for the inker rolls is separable between the gear 9 and the pinion 10 and the gear drive between the fountain inker and the vibrator inker is separable between the gears 14 and 15. The fork 228 is separable from the roller 225, the fork 72 is separable from the roller 71 and the rod 138 is separable from the arm 137. All these connections enable the inker to be moved into and out of operative or inking position without the necessity of any connections or adjustments being made by the operator.

Separate means is provided for moving the form rollers 4, 5 and 6 out of contact with the form or out of the position in which they engage the form upon oscillation of the latter. The roller 4 is mounted upon a shaft 253, the roller 5 is mounted upon a shaft 254 and the roller 6 is mounted upon a shaft 255 (see Figures 8 and 9). The right-hand ends of the shafts 253, 254 and 255 viewing Figure 8 are mounted in bearings 256, 257 and 258, respectively, while the left-hand ends of such shafts are mounted in bearings 259, 260 and 261, respectively. The bearings 256 and 259 are alike, the bearings 257 and 260 are alike and the bearings 258 and 261 are alike. The bearings 259, 260 and 261 are clearly shown in Figure 9. Each thereof comprises a downwardly extending stem 262 extending within a socket 263 in a bearing block 264 carried by the stationary frame. A set screw 265 provided with an adjusting nut 266 enters each of the sockets 263 axially at its bottom, the stems 262 normally resting on the ends of the set screws as shown in Figure 9. Thus the operative positions of the form rollers 4, 5 and 6 may readily be adjusted.

The bearing 259 comprises a half yoke 267 carried by its stem 262, a spring pressed latch 268 cooperating with the half yoke 267 to hold one end of the shaft 253 therein as shown in Figure 9. The bearing 260 comprises a yoke 269 carried by its stem 262, the yoke 269 facing upwardly as shown in Figure 9 and containing one end of the shaft 254. The bearing 261 comprises a yoke 270 carried by its stem 262, the yoke 270 facing at an angle of about 45° upwardly and to the left as shown in Figure 9 and containing one end of the shaft 255.

The stationary frame carries a pin 271 to which is pivoted a link 272. Pivoted to the link 272 at 273 is an elevating member 274 which normally lies below and out of contact with the ends of the shafts 253, 254 and 255 immediately adjacent the bearings 259, 260 and 261. The opposite end of the elevating member 274 is pivoted at 275 to an arm 267 fixed to a shaft 277. Also fixed to the shaft 277 is an operating handle 278. Upon turning of the operating handle 278 the elevating member 274 is swung generally upwardly and somewhat to the left viewing Figure 9 upon the arm 276 and the link 272 and upon such movement it engages the shafts 253, 254 and 255 immediately adjacent the bearings 259, 260 and 261 and thereby raises one end of each of the three form roller shafts, also raising, of course, one end of each of the three form rollers. The elevating member 274 and its operating mechanism are so designed and proportioned that such member will raise one end of each of the three form rollers sufficiently that all of the form rollers will be moved to a position in which they will be entirely out of engagement with the form, even if the form be positioned immediately below the form rollers.

Since the end of the shaft 253 is locked within the half yoke 267 by the latch 268, upward movement of such end of the shaft 253 is necessarily accompanied by upward movement of the bearing 259, which is permitted by reason of the fact that the stem 262 thereof is loosely and slidably received within the corresponding socket 263. Since the yoke 269 opens directly upwardly the end of the shaft 254 will simply be raised out of such yoke by the elevating member and the yoke will remain in place as shown in Figure 9. The end of the shaft 255 positioned by yoke 270 will either slide up at an angle within the yoke while the yoke remains stationary or carry the yoke up with it upon being raised by the elevating member 274 depending on whether the friction between the shaft end and the yoke is greater or less than the friction between the stem 262 of the bearing 261 and its socket 263. However this may be, each of the three form rollers may be tilted by the elevating member 274 as above described to position it at a point offset from the path of the form. The elevating member 274 is used for thus tilting the form rollers only when the vibrator inker is raised at least high enough to permit the form rollers to be tilted to the desired extent so that they will not engage the form. When the inker is not being used the form rollers should be raised and if desired the inker can be moved only a short distance out of inking position to tilt the frame 46 to position the vibrator rollers 28 and 29 in approximately the positions indicated in chain lines at the top of Figure 9, thus permitting the desired tilting of the form rollers 4, 5 and 6 by the elevating member 274. Such an operation would be performed, for example, in stopping for lunch or when for some other reason it is necessary to stop the press but there is no occasion for any work to be done thereon. Of course when the inker is moved clear back to the position shown in Figure 3 the form rollers will be tilted as above described. The means for raising the form rollers just described is claimed in my copending application Serial No. 415,402.

As will be seen from Figure 9, the form rollers 5 and 6 cannot be removed when the inker is in operative position because the vibrator rollers 28 and 29 prevent such removal. The form roller 4 may, however, be removed even when the entire inker is in operative position. This is done by raising the spring pressed latches holding the ends of the shaft 253 in the bearings 259 and 260, respectively, whereupon the form roller 4 may be removed in a direction substantially perpendicular to a plane containing the axes of the shafts 253 and 213. This possibility of removing the form roller 4 without otherwise disturbing the inker is of great practical value in use.

Figure 16:
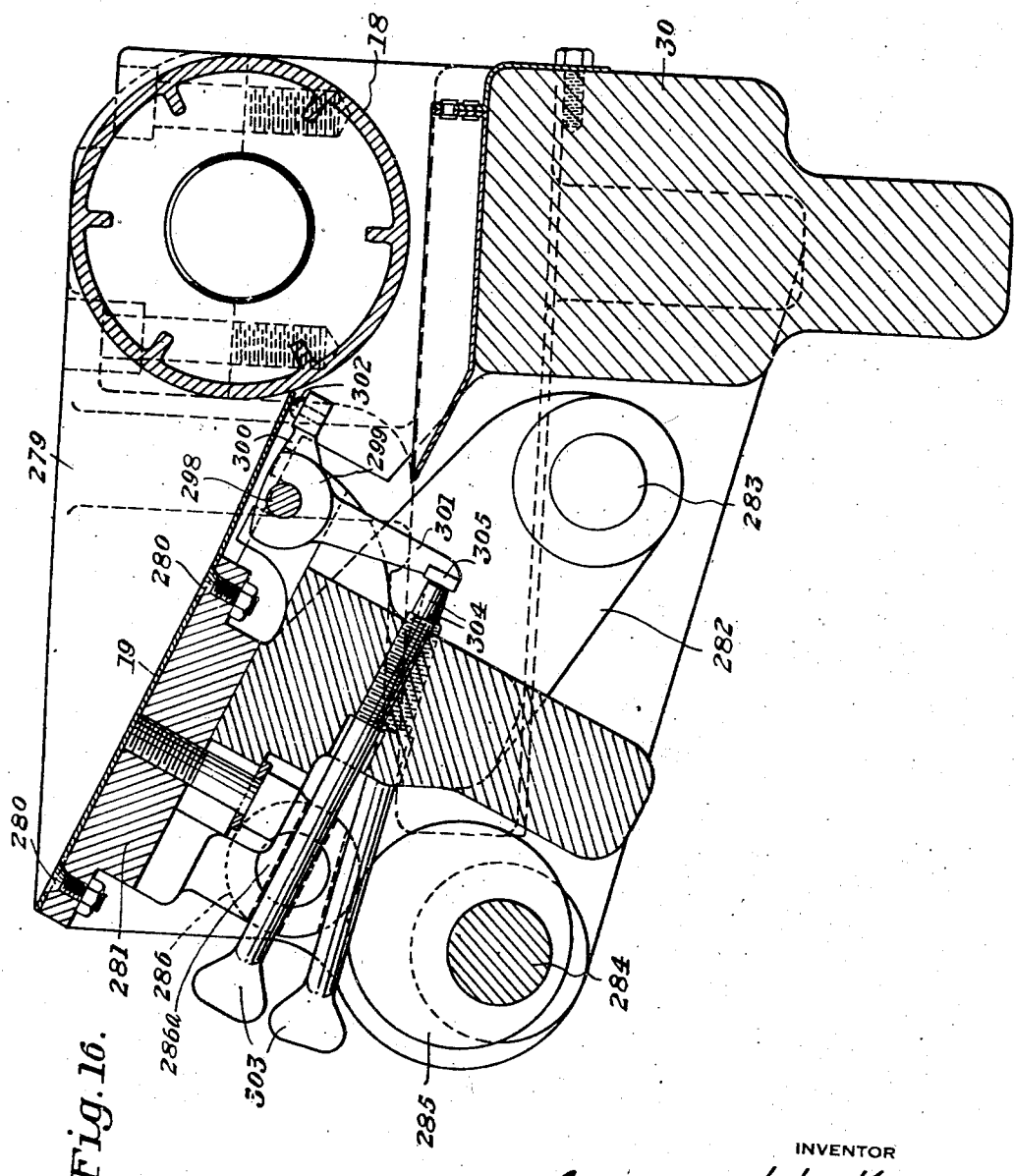
Figure 16 is a vertical longitudinal cross-sectional view to considerably enlarged scale through the ink fountain and fountain roll.
Figure 17:
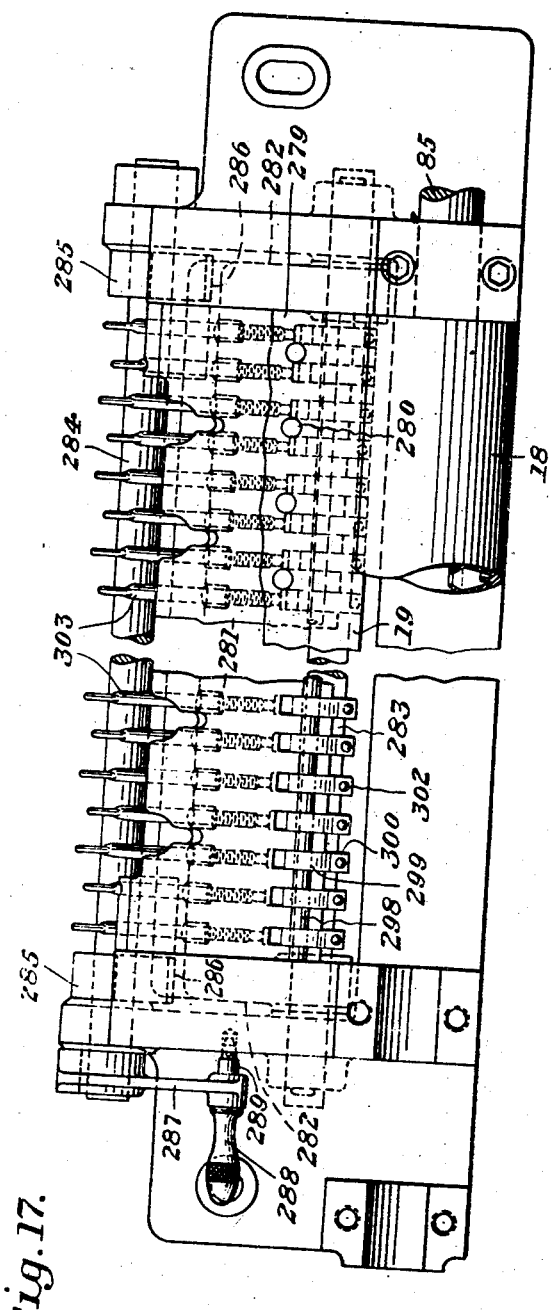
Figure 17 is a top plan view of the left-hand end of the inker viewing Figure 1 showing the fountain and fountain roll.
Figure 18:
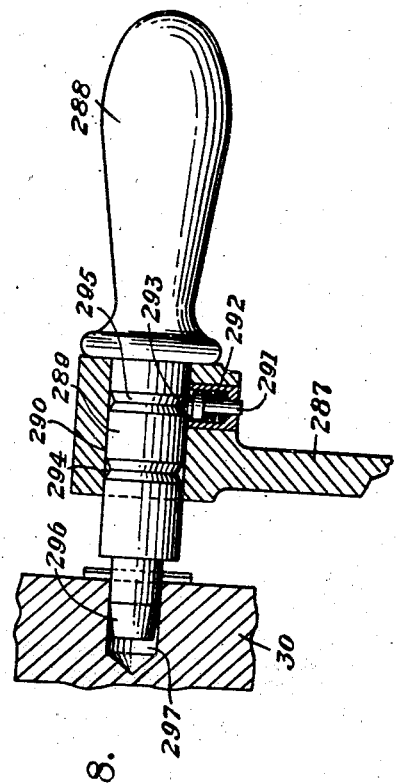
Figure 18 is a fragmentary transverse cross-sectional view showing the handle for raising and lowering the fountain blade.

Referring now to Figures 16, 17 and 18, the fountain roll 18 is mounted in the ink fountain 279. The fountain blade 19 is fastened by bolts 280 to a support 281 carried by arms 282 pivotally mounted upon a shaft 283. A shaft 284 is rotatably mounted in the fountain inker frame 30, such shaft carrying a pair of eccentric cams 285 respectively engaging rollers 286 journaled on stub shafts 286a on the support 281. An operating lever 287 is fixed to one end of the shaft 284 and carries a handle 288. The handle 288 has a generally cylindrical portion 289 entering a generally cylindrical bore 290 in the end of the operating lever 287 and the operating lever also has a pin 291 pressed by a spring 292 inwardly of the bore 290, the pin having a tapered nose 293. The generally cylindrical portion 289 of the handle 288 has a pair of tapered grooves 294 and 295 into each of which the tapered nose 293 of the pin 291 is adapted to project. Thus the handle 288 is movable axially between the position shown in Figure 18 in which it is resiliently latched by the pin 291 and an outer position in which the pin 291 cooperates with the groove 294. When the handle is in the inner position shown in Figure 18 its nose 296 is adapted to enter a bore 297 in the frame 30. The bore 297 is so positioned in the frame 30 that the nose of the handle will enter it when the eccentric cams 285 are in the position shown in Figure 16. The function of the eccentric cams 285 is to swing the support 281 about the axis of the shaft 283 to raise and lower the fountain blade 19. The mechanism described affords a very simple and effective means of raising and lowering the fountain blade.

Improved means for adjusting the operative edge of the fountain blade to the fountain roll are also provided. Extending transversely of the inker is a shaft 298 pivotally mounted upon which is a plurality of bell crank levers 299 each having an arm 300 extending generally parallel to the fountain blade 19 adjacent its operative edge (the edge of the fountain blade cooperating with the fountain roll 18) and an arm 301 extending substantially at right angles to the arm 300 generally downwardly away from the fountain blade. Each arm 300 carries at its extremity an abutment member 302 engaging the lower surface of the blade 19 adjacent its operative edge as shown in Figure 16. Threadedly mounted in the support 281 is a plurality of adjusting keys 303 the inner end 304 of each of which engages the lower extremity 305 of one of the arms 301 of a bell crank lever 299. By turning a key 303 it moves forward or backward in its threaded bore in the support 281 and thus positions the corresponding bell crank lever 299 as desired. When the key is screwed forwardly or generally toward the right viewing Figure 16 it turns the bell crank lever in the counterclockwise direction about the axis of the shaft 298, the abutment member 302 thereof pressing upwardly upon the blade 19 to move its operative edge nearer to the fountain roll 18. When the key is screwed rearwardly it allows the bell crank lever to turn in the clockwise direction about the axis of the shaft 298 so that the operative edge of the blade will recede from the fountain roll. The portion of the blade between its operative edge and the lower bolts 280 viewing Figure 16 is maintained under tension by the mechanism just described so that release of pressure by an abutment member 302 on the blade is accompanied by springing back of the blade generally downwardly away from the fountain roll.

The keys 303 are positioned closely together as shown in Figure 17, each operating to control a short section of the edge of the fountain blade through its cooperating bell crank lever 299 as above explained. Since a large number of keys are provided the operative edge of the fountain blade may be accurately adjusted throughout its length to the desired relationship with the fountain roll 18.

To facilitate operation of the keys 303 they are arranged with their heads in two rows as shown. Alternate keys have their heads in the upper and lower of such rows, the positions of which are defined by the heads of the keys as shown in Figure 16. This provides greatly increased clearance between the heads of the keys relative to the clearance which would be provided if they were all arranged in one row and greatly facilitates manipulation and operation thereof. The fountain blade adjusting and operating mechanism just described is claimed in my copending application Serial No. 415,404.

While I have shown and described a present preferred embodiment of the invention and have illustrated a present preferred method of practicing the same it is to be distinctly understood that the invention is not limited thereto but may be otherwise variously embodied and practiced within the scope of the following claims.

I claim:

1. In an inker for a printing press having an oscillating form, which inker has an ink fountain and form inking means for applying ink to the oscillating form of the press, means interposed between said ink fountain and the form inking means for delivering fresh ink from said ink fountain to the form inking means upon each oscillation of the form in each direction of oscillation.

2. In an inker for a printing press having an oscillating form, a fountain roller, form inking means for applying ink to the oscillating form of the press, and means interposed between said fountain roller and the form inking means for delivering fresh ink from said fountain roller to the form inking means upon each oscillation of the form in each direction of oscillation.

3. In an inker for a printing press having an oscillating form, an ink fountain, form inking means for applying ink to the oscillating form of the press, and means interposed between said ink fountain and the form inking means for taking fresh ink from said ink fountain and delivering it to the form inking means upon each oscillation of the form in each direction of oscillation.

4. In an inker for a printing press having an oscillating form, an ink fountain, form inking means for applying ink to the oscillating form of the press, and transfer means for delivering fresh ink from said ink fountain to the form inking means, the transfer means including ductor means delivering fresh ink from said ink fountain upon each oscillation of the form in each direction of oscillation.

5. In an inker for a printing press having an oscillating form, an ink fountain, form inking means for applying ink to the oscillating form of the press, and transfer means for delivering fresh ink from said ink fountain to the form inking means, the transfer means including ductor means having a portion movable with a batch of fresh ink from said ink fountain into operative position to deliver through the transfer means said batch of fresh ink to the form inking means upon each oscillation of the form in each direction of oscillation.

6. In an inker for a printing press having an oscillating form, an ink fountain, form inking means for applying ink to the oscillating form of the press, and transfer means for delivering fresh ink from said ink fountain to the form inking means, the transfer means including means delivering fresh ink from said ink fountain upon each oscillation of the form in each direction of oscillation, the transfer means providing a path of such length and having means for operating it at such speed that fresh ink delivered from said ink fountain during an oscillatory movement of the form in one direction of oscillation reaches the form inking means during that same movement.

7. In an inker for a printing press having an oscillating form, an ink fountain, form inking means for applying ink to the oscillating form of the press, and transfer means for delivering fresh ink from said ink fountain to the form inking means, the transfer means including means delivering fresh ink from said ink fountain upon each oscillation of the form in each direction of oscillation, the transfer means providing a path of such length and having means for operating it at such speed that fresh ink delivered from said ink fountain during an oscillatory movement of the form in one direction of oscillation reaches the form inking means during that same movement but is not applied by the form inking means to any considerable area of the form until the succeeding oscillatory movement of the form in the opposite direction of oscillation.

8. In an inker for a printing press having an oscillating form, an ink fountain, form inking means for applying ink to the oscillating form of the press, and transfer means for delivering fresh ink from said ink fountain to the form inking means, the transfer means including means delivering fresh ink from said ink fountain upon each oscillation of the form in each direction of oscillation, the transfer means providing a path of such length and having means for operating it at such speed that fresh ink delivered from said ink fountain during an oscillatory movement of the form in one direction of oscillation reaches the form inking means during that same movement and is applied to the form during the succeeding oscillatory movement of the form in the opposite direction of oscillation.

9. In an inker for a printing press having an oscillating form, a fresh ink supply roller, form inking means for applying ink to the oscillating form of the press, and transfer means for delivering fresh ink from the fresh ink supply roller to the form inking means, the transfer means including a pair of ductor rollers one of which delivers fresh ink from the fresh ink supply roller upon each oscillation of the form in each direction of oscillation, means for turning the fresh ink supply roller in periodic step-by-step movements always in the same direction, one step for each oscillation of the form in each direction of oscillation, means for shifting the ductor rollers alternately into contact with the fresh ink supply roller, said last mentioned means being so constructed and arranged relatively to the turning movements of the fresh ink supply roller as to bring each ductor roller always into contact with a freshly inked surface portion of the fresh ink supply roller not previously contacted by the other ductor roller, a portion of the surface of the fresh ink supply roller contacted by one of the ductor rollers thereafter passing opposite the other ductor roller while the latter is out of contact with the fresh ink supply roller.

10. In an inker for a printing press having an oscillating form, a fresh ink supply roller, form inking means, transfer means for transferring ink from the fresh ink supply roller to the form inking means, and means for turning the fresh ink supply roller in periodic movements, said means turning the fresh ink supply roller upon each oscillation of the form in each direction of oscillation.

11. In an inker for a printing press having an oscillating form, a fresh ink supply roller adapted for periodic turning movements, driving means oscillatable synchronously with the form, and connections between the driving means and the fresh ink supply roller for turning the fresh ink supply roller upon each oscillation of the driving means in each direction of oscillation.

12. In an inker, a fresh ink supply roller adapted for periodic turning movements, an oscillatable driving member, and dual connections between the driving member and the fresh ink supply roller one turning the fresh ink supply roller upon a movement of the driving member in one direction and the other turning the fresh ink supply roller upon a movement of the driving member in the other direction.

13. In an inker, a fresh ink supply roller adapted for periodic turning movements, oscillatable driving means including a double rack, and means respectively meshing with the respective rack elements for turning the roller upon oscillation of the driving means in each direction of oscillation.

14. In an inker, a fresh ink supply roller adapted for periodic turning movements, oscillatable driving means, a ratchet connected with the roller, and a pair of pawl carrying gears oscillatable by the driving means and having their pawls respectively engaging the ratchet to turn the roller upon oscillation of the driving means in the respective directions of oscillation thereof.

15. In combination, turnable ratchet means, oscillatable rack means, a pair of pinions meshing with the rack means, and a pawl connected with each pinion and engaging the ratchet means, one pawl advancing the ratchet means upon movement of the rack means in one direction and the other pawl advancing the ratchet means upon movement of the rack means in the other direction.

16. In combination, a shaft, ratchet means on the shaft, a pair of pawl carrying pinions turnable about the shaft with the pawls thereof engaging the ratchet means, and oscillatable driving means including rack means meshing with the pinions so that one pawl advances the ratchet means upon movement of the driving means in one direction and the other pawl advances the ratchet means upon movement of the driving means in the other direction.

17. In combination, a shaft, ratchet means on the shaft, a pair of pinion segments each independently turnable about the shaft and each having a resiliently mounted pawl engaging the ratchet means, and oscillatable driving means including a pair of racks each meshing with one of the pinion segments whereby to oscillate the pinion segments and the pawls carried thereby upon oscillation of the driving means so that one pawl advances the ratchet means upon movement of the driving means in one direction and the other pawl advances the ratchet means upon movement of the driving means in the other direction.

18. In an inker, an ink supply roller, means for intermittently turning the ink supply roller, a ductor roller, means for shifting the ductor roller toward and away from the ink supply roller, and means separate from the shifting means determining the period of engagement between the ink supply roller and the ductor roller when the ductor roller has been shifted toward the ink supply roller, said last mentioned means including a cam operable by the means for intermittently turning the ink supply roller and follower means connected with the ductor roller and adapted to engage said cam.

19. In an inker, a primary section including an ink fountain and means including cooperating normally contacting rolls for delivering ink therefrom toward the point of application to the form, a secondary section including means for receiving ink from the primary section and delivering the same further toward the point of application to the form, the primary and secondary sections being so constructed and arranged that the primary section is separable from the secondary section and movable independently away therefrom while the secondary section remains in inking position and means operable upon separation of the primary and secondary sections for breaking contact between said rolls.

20. In an inker for a printing press having an oscillating form, an ink fountain, a fountain roll therein, an ink drum, ductor means for delivering ink from the fountain roll to the ink drum, form rollers and means for delivering ink from the ink drum to the form rollers, the ductor means, ink drum, form rollers and means for delivering ink from the ink drum to the form rollers being so constructed and arranged that the path of travel of ink from the ductor means to the form upon operation of the inker is of such length relative to the amplitude of oscillation of the form and the speed of operation of the inker relative to the speed of oscillation of the form is such that upon an oscillating movement of the form in one direction fresh ink is delivered from the ductor means approximately to the point of application to the form.

21. In an inker, an ink fountain, a fountain roll therein, an ink drum, ductor means for delivering ink from the fountain roll to the ink drum, a composition idler contacting the ink drum, a driven metal roller contacting said idler, a second composition idler contacting said driven metal roller, a metal idler contacting said second composition idler, a third composition idler contacting said metal idler, a pair of metal vibrator rollers contacting said third composition idler, and three composition idler form rollers contacting said vibrator rollers.

22. In an inker, an ink fountain, a fountain roll therein, an ink drum, a pair of ductor rollers alternating to deliver ink from the fountain roll to the ink drum, a composition idler contacting the ink drum, a driven metal roller contacting said idler, a second composition idler contacting said driven metal roller, a metal idler contacting said second composition idler, a third composition idler contacting said metal idler, a pair of metal vibrator rollers contacting said third composition idler, and three composition idler form rollers contacting said vibrator rollers.

23. In an inker for a printing press having an oscillating form, fresh ink supply surface, form inking means for applying ink to the oscillating form of the press, and transfer means interposed between the fresh ink supply surface and the form inking means for taking fresh ink from said surface and delivering it to the form inking means upon each oscillation of the form in each direction of oscillation, the transfer means including a pair of ductor rollers one of which contacts with the fresh ink supply surface when the form oscillates in one direction and with a portion of the transfer means communicating with the form inking means when the form oscillates in the opposite direction and the other of which contacts with a portion of the transfer means communicating with the form inking means when the form oscillates in the first mentioned direction and with the fresh ink supply surface when the form oscillates in the second mentioned direction.

24. In an inker for a printing press having an oscillating form, fresh ink supply surface, form inking means for applying ink to the oscillating form of the press, and transfer means interposed between the fresh ink supply surface and the form inking means for taking fresh ink from said surface and delivering it to the form inking means upon each oscillation of the form in each direction of oscillation, the transfer means including a pair of ductor rollers one of which contacts with the fresh ink supply surface when the form oscillates in one direction and with a portion of the transfer means communicating with the form inking means when the form oscillates in the opposite direction and the other of which contacts with a portion of the transfer means communicating with the form inking means when the form oscillates in the first mentioned direction and with the fresh ink supply surface when the form oscillates in the second mentioned direction and providing a path of such length and having means for operating it at such speed that fresh ink delivered by a ductor roller during an oscillatory movement of the form in one direction of oscillation reaches the form inking means during that same movement and is applied to the form during the succeeding oscillatory movement of the form in the opposite direction of oscillation.

25. In an inker for a printing press having an oscillating form, an ink fountain, a fountain roll therein, three composition idler form rollers for applying ink to the oscillating form of the press, and transfer means interposed between the fountain roll and the form rollers for taking fresh ink from the fountain roll and delivering it to the form rollers upon each oscillation of the form in each direction of oscillation, the transfer means including an ink drum, a pair of ductor rollers, one of which contacts with the fountain roll when the form oscillates in one direction and with the ink drum when the form oscillates in the opposite direction and the other of which contacts with the ink drum when the form oscillates in the first mentioned direction and with the fountain roll when the form oscillates in the second mentioned direction, a composition idler contacting the ink drum, a driven metal roller contacting said idler, a second composition idler contacting said driven metal roller, a metal idler contacting said second composition idler, a third composition idler contacting said metal idler, and a pair of metal vibrator rollers contacting said third composition idler, the form rollers contacting said vibrator rollers, the transfer means providing a path of such length and having means for operating it at such speed that fresh ink delivered by a ductor roller during an oscillatory movement of the form in one direction of oscillation reaches the form rollers during that same movement and is applied to the form during the succeeding oscillatory movement of the form in the opposite direction of oscillation.

26. In an inker for a printing press having an oscillating form, an ink fountain, form inking means for applying ink to the oscillating form of the press, and transfer means interposed between said ink fountain and the form inking means for taking fresh ink from said ink fountain and delivering it to the form inking means upon each oscillation of the form in each direction of oscillation, the transfer means including ductor means shiftable between said ink fountain and a portion of the transfer means communicating with the form inking means and the transfer means being so constructed and arranged as to provide a path of such length and having means for operating it at such speed that fresh ink delivered by the ductor means during an oscillatory movement of the form in one direction of oscillation reaches the form inking means during that same movement and is applied to the form during the succeeding oscillatory movement of the form in the opposite direction of oscillation.

27. In an inker, a primary section including an ink fountain and means for delivering ink therefrom, a secondary section including means for receiving ink from the primary section and delivering the same toward the point of application to the form, form rollers separate from said secondary section and a separable connection between the primary and secondary sections, the primary and secondary sections being so constructed and arranged that the primary section is movable independently away from the secondary section while the secondary section remains in inking position when said connection is open and both sections are movable together away from inking position when said connection is closed.

28. In an inker, a primary section including an ink fountain and means for delivering ink therefrom, a secondary section including means for receiving ink from the primary section and delivering the same toward the point of application to the form, and one rotary connecting member only which in one angular position connects said sections together and in another angular position disconnects said sections to permit the primary section to be moved independently away from the secondary section while the secondary section remains in inking position.

29. In an inker, a primary section including an ink fountain and means for delivering ink therefrom, a secondary section including means for receiving ink from the primary section and delivering the same toward the point of application to the form, and means for moving said sections together out of inking position by translation of the primary section and movement of the secondary section non-parallel to the direction of movement of the primary section.

30. In an inker, a primary section including an ink fountain and means for delivering ink therefrom, a secondary section including means for receiving ink from the primary section and delivering the same toward the point of application to the form, and means for moving said sections together out of inking position by differential movement of said sections.

31. In an inker, a primary section including an ink fountain and means for delivering ink therefrom, a secondary section including means for receiving ink from the primary section and delivering the same toward the point of application to the form, and means for moving said sections together out of inking position by translation of the primary section and turning movement of the secondary section.

32. In an inker, a primary section including an ink fountain and means for delivering ink therefrom, a secondary section including means for receiving ink from the primary section and delivering the same toward the point of application to the form, and means for moving said sections together out of inking position by translation of the primary section and initial turning movement of the secondary section followed by translation of the secondary section.

33. In an inker, a primary section including an ink fountain and means for delivering ink therefrom, a secondary section including means for receiving ink from the primary section and delivering the same toward the point of application to the form, and means for moving said sections together out of inking position by translation of the primary section and initial turning movement of the secondary section followed by translation of the secondary section generally parallel to the direction of movement of the primary section.

34. In an inker, a primary section including an ink fountain and means for delivering ink therefrom, a secondary section including means for receiving ink from the primary section and delivering the same toward the point of application to the form, and means for moving said sections together out of inking position by translation of the primary section and generally upward and outward movement of the secondary section away from inking position.

35. In an inker, an ink fountain, form inking means and transfer means for transferring ink from the ink fountain to the form inking means, the ink fountain and transfer means being so constructed and arranged as to be movable to a position remote from the form inking means while the form inking means remain in inking position, the form inking means being so constructed and arranged to be independently tiltable to a position out of the path of the form.

36. In an inker, a primary section including an ink fountain and means for delivering ink therefrom, a secondary section including means for receiving ink from the primary section and delivering the same toward the point of application to the form, and form inking means for receiving ink from the secondary section and applying the same to the form, the primary section being so constructed and arranged as to be movable independently away from the secondary section and form inking means while the secondary section and form inking means remain in inking position, and the primary and secondary sections being so constructed and arranged as to be movable together away from the form inking means while the form inking means remain in inking position.

37. In an inker, a plurality of form rollers, ink transfer rollers engaging said form rollers, mounting means for said rollers so constructed and arranged that at least one of said form rollers with which an ink transfer roller engages may be removed in a direction transverse of its axis without moving said ink transfer rollers, and means for simultaneously moving said form rollers to a position out of the path of the form to occupy a portion of the space normally occupied by said ink transfer rollers.

38. In an inker for a printing press, a primary section including an ink fountain and means for delivering ink therefrom, and a secondary section including means for receiving ink from the primary section and delivering the same toward the point of application to the press form, the primary and secondary sections being separably connected together at one end of the secondary section and the secondary section being separably connected to the press at the opposite end of the secondary section.

39. In an inker for a printing press, a primary section including an ink fountain and means for delivering ink therefrom, a secondary section including means for receiving ink from the primary section and delivering the same toward the point of application to the press form, a rotary connecting member which in one angular position connects said primary and secondary sections together and in another angular position disconnects said sections, and a second rotary connecting member which in one angular position connects said secondary section to the press and in another angular position disconnects the same therefrom.

40. In an inker, at least a portion of the inker being movable away from inking position, a composition roller in said portion of the inker, another roller in said portion of the inker with which the composition roller contacts to transfer ink during operation of the inker when said portion of the inker is in inking position, means urging the composition roller out of contact with said other roller, and means counteracting said last mentioned means to hold the composition roller in contact with said other roller only when said portion of the inker is in inking position.

41. In an inker, at least a portion of the inker being movable away from inking position, a composition roller in said portion of the inker, another roller in said portion of the inker with which the composition roller contacts to transfer ink during operation of the inker when said portion of the inker is in inking position, mounting means for said rollers, and connections with said mounting means separating said rollers when said portion of the inker is moved away from inking position.

42. In an inker for a printing press having a cylinder, at least a portion of the inker being movable away from inking position adjacent the press cylinder, a composition roller in said portion of the inker, another roller in said portion of the inker with which the composition roller contacts to transfer ink during operation of the inker when said portion of the inker is in inking position adjacent the press cylinder, mounting means for said rollers, connections with the mounting means for at least one of said rollers cooperable with a portion of the press when said portion of the inker is in inking position adjacent the press cylinder to maintain said rollers in contact with each other, and resilient means connected with the mounting means for at least one of said rollers separating said rollers when said portion of the inker is moved away from inking position adjacent the press cylinder.

43. In an inker for a printing press, at least a portion of the inker being movable away from inking position, a composition roller in said portion of the inker, another roller in said portion of the inker with which the composition roller contacts to transfer ink during operation of the inker when said portion of the inker is in inking position, mounting means for said rollers, a lever connected with the mounting means for at least one of said rollers, means on the press cooperable with said lever when said portion of the inker is in inking position to maintain said rollers in contact with each other, and resilient means cooperable with said lever separating said rollers when said portion of the inker is moved away from inking position.

44. In an inker for a printing press, at least a portion of the inker being movable away from inking position, a composition roller in said portion of the inker, another roller in said portion of the inker with which the composition roller contacts to transfer ink during operation of the inker when said portion of the inker is in inking position, mounting means for said rollers, shifting means including a cam follower connected with the mounting means for at least one of said rollers, cam means connected with the press cooperable with said cam follower when said portion of the inker is in inking position to maintain said rollers in contact with each other, and resilient means cooperable with said shifting means separating said rollers when said portion of the inker is moved away from inking position.

45. In an inker, a primary section including an ink fountain and means for delivering ink therefrom, a secondary section including means for receiving ink from the primary section and delivering the same toward the point of application to the form, a pivotal connection between said sections, a horizontal track upon which said primary section is movable, an inclined track, and means on the secondary section adapted to ride upon said inclined track to impart to the secondary section a turning movement about said pivotal connection relatively to the primary section when the primary section is moving along said horizontal track.

46. In an inker for a printing press, a primary section including an ink fountain and means for delivering ink therefrom, a secondary section including means for receiving ink from the primary section and delivering the same toward the point of application to the form, a composition roller in said secondary section, another roller in said secondary section with which the composition roller contacts to transfer ink during operation of the inker when the inker is in inking position, mounting means for said rollers, a pivotal connection between said sections, a horizontal track upon which said primary section is movable toward and away from inking position, an inclined track, means on the secondary section adapted to ride upon said inclined track to impart to the secondary section a turning movement about said pivotal connection relatively to the primary section when the primary section is moving along said horizontal track, a lever connected with the mounting means for at least one of said rollers, means on the press cooperable with said lever when the inker is in inking position to maintain said rollers in contact with each other, and resilient means cooperable with said lever separating said rollers when the inker is moved on said tracks away from inking position.

47. In an inker for a printing press, a primary section including an ink fountain and means for delivering ink therefrom, a secondary section including means for receiving ink from the primary section and delivering the same toward the point of application to the form, a composition roller in said secondary section, another roller in said secondary section with which the composition roller contacts to transfer ink during operation of the inker when the inker is in inking position, mounting means for said rollers, a pivotal connection between said sections, a horizontal track upon which said primary section is movable toward and away from inking position, an inclined track, means on the secondary section adapted to ride upon said inclined track to impart to the secondary section a turning movement about said pivotal connection relatively to the primary section when the primary section is moving along said horizontal track, and means connected with the mounting means for at least one of said rollers cooperating with a portion of the press upon movement of the inker into inking position to move said rollers into contact with each other.

48. In an inker for a printing press, which inker is movable into and away from inking position, a primary section including an ink fountain and means for delivering ink therefrom, a secondary section including means for receiving ink from the primary section and delivering the same toward the point of application to the form, a composition roller in said secondary section, another roller in said secondary section with which the composition roller contacts to transfer ink during operation of the inker when the inker is in inking position but which is out of contact with the composition roller when the inker is away from inking position, and means moving said rollers into contact with each other upon movement of the inker into inking position.

49. In an inker which is movable into and away from inking position, a primary section including an ink fountain and means for delivering ink therefrom, a secondary section movable relatively to the primary section and including means for receiving ink from the primary section and delivering the same toward the point of application to the form, a composition roller in the secondary section, another roller in the secondary section which contacts with the composition roller during operation of the inker when the inker is in inking position and means for separating the composition roller and said other roller when the sections are moved relatively to each other.

50. In an inker, a primary section including an ink fountain and means for delivering ink therefrom, a secondary section including means for receiving ink from the primary section and delivering the same toward the point of application to the form, and a separable connection between the primary and secondary sections, the primary section being so constructed and arranged as to be movable independently away from the secondary section while the secondary section remains in inking position when said connection is open, and both sections being so constructed and arranged as to be movable together away from inking position, but with differential movement, when said connection is closed, the secondary section being so constructed and arranged as to be movable away from inking position only with the primary section and when said connection is closed.

51. A method of inking an oscillating form from an ink fountain comprising applying fresh ink from said ink fountain to the form upon each oscillation of the form in each direction of oscillation.

52. A method of inking an oscillating form from an ink fountain comprising engaging the form by ink applying means upon each oscillation of the form in each direction of oscillation and in each half cycle of oscillation of the form delivering fresh ink from said ink fountain to the ink applying means.

53. A method of inking an oscillating form from an ink fountain comprising transferring ink from ink applying means to the form upon each oscillation of the form in each direction of oscillation and in each half cycle of oscillation of the form supplementing the ink on the ink applying means by additional fresh ink from said ink fountain.

54. In an inker, a ductor roller, means for shifting the ductor roller to transfer ink from an ink supplying surface to an ink receiving surface, said shifting means including an oscillatable member, a second member and a positive motion connection between said oscillatable member and said second member to cause the latter to oscillate synchronously with the former, means for rendering said connection inoperative, and means positioning the ductor roller out of contact with the ink supplying surface and the ink receiving surface upon rendering inoperative of said connection.

55. In an inker, a ductor roller, a first angularly oscillatable member, a second angularly oscillatable member oscillatable about the same axis as said first angularly oscillatable member, a connection between said second angularly oscillatable member and the ductor roller for shifting the ductor roller to transfer ink from an ink supplying surface to an ink receiving surface upon angular oscillation of said second angularly oscillatable member, a detent connecting said second angularly oscillatable member to said first angularly oscillatable member so that the former oscillates with the latter, means for rendering said detent inoperative so that continued oscillation of the first angularly oscillatable member is not accompanied by oscillation of the second angularly oscillatable member, and means positioning the ductor roller out of contact with the ink supplying surface and the ink receiving surface upon rendering inoperative of said detent.

56. In an inker, a ductor roller, a first double arm lever, means cooperating with one arm of said lever to oscillate the same, a second double arm lever turnable about the same axis as the first lever, a connection between one arm of the second lever and the ductor roller for shifting the ductor roller to transfer ink from an ink supplying surface to an ink receiving surface upon angular oscillation of the second lever, a third double arm lever pivoted to the other arm of the second lever, one arm of the third lever engaging the second arm of the first lever so that the second lever oscillates with the first lever, means adapted to cooperate with the second arm of the third lever to hold the same against movement in one direction whereupon upon movement of the first and second levers in one direction the first arm of the third lever disengages from the second arm of the first lever so that continued oscillation of the first lever is not accompanied by oscillation of the second lever, and means including a stop against which the first arm of the third lever engages upon being disengaged from the second arm of the first lever for stopping the second lever in such position that the ductor roller is out of contact with the ink supplying surface and the ink receiving surface.

57. In an inker, a primary section including an ink fountain and means for delivering ink therefrom toward the point of application to the form and a secondary section including means for receiving ink from the primary section and delivering the same further toward the point of application to the form, each of the primary and secondary sections being movable out of inking position, the primary section having holding means so constructed and arranged that when the inker is in inking position such means engages a portion of the secondary section in overlying relationship only to assist in maintaining the secondary section in position.

58. In an inker, a primary section including an ink fountain and means for delivering ink therefrom toward the point of application to the form and a secondary section pivotally connected to the primary section and including means for receiving ink from the primary section and delivering the same further toward the point of application to the form, the sections having portions so constructed and arranged that when the inker is in inking position such portions engage one upon the other to assist in maintaining the inker in position.

59. In an inker, a primary section including an ink fountain and means for delivering ink therefrom toward the point of application to the form and a secondary section pivotally connected to the primary section and including means for receiving ink from the primary section and delivering the same further toward the point of application to the form, the primary section being translatable into and out of inking position and the secondary section being turnable upon translation of the primary section through the pivotal connection between the sections, the secondary section having a bearing member upon which such section is thus turnable, the primary section having holding means so constructed and arranged that when the inker is in inking position such means engages a portion of the secondary section in overlying relationship to assist in maintaining the secondary section in position.

60. In an inker for a printing press, which inker is movable into and away from inking position, a primary section including an ink fountain and means for delivering ink therefrom, a secondary section including means for receiving ink from the primary section and delivering the same toward the point of application to the form, a composition roller in said secondary section, another roller in said secondary section with which the composition roller contacts to transfer ink during operation of the inker when the inker is in inking position but which is out of contact with the composition roller when the inker is away from inking position, means for turning the secondary section during movement of the inker into and away from inking position and means moving said rollers into contact with each other upon movement of the inker into inking position.

61. In an inker which is movable into and away from inking position, a primary section including an ink fountain and means for delivering ink therefrom, a secondary section including means for receiving ink from the primary section and delivering the same toward the point of application to the form, a composition roller in the secondary section, another roller in the secondary section which contacts with the composition roller during operation of the inker when the inker is in inking position but which is out of contact with the composition roller when the inker is away from inking position and means for differentially moving the respective sections of the inker when the inker is moved into and away from inking position.

62. In an inker, a vibrator roller, an oscillatable member comprising a spur gear segment and a bevel gear segment, means including a gear meshing with one of the segments for oscillating the oscillatable member and means including a gear meshing with the other segment for vibrating the vibrator roller upon oscillation of the oscillatable member.

63. In an inker, a vibrator roller, an oscillatable member comprising a spur gear segment and a bevel gear segment, means including a spur gear meshing with the spur gear segment for oscillating the oscillatable member and means including a bevel gear meshing with the bevel gear segment for vibrating the vibrator roller upon oscillation of the oscillatable member.

64. In an inker, a vibrator roller, an oscillatable member comprising a spur gear segment and a bevel gear segment, means including a spur gear meshing with the spur gear segment for oscillating the oscillatable member, a bevel gear meshing with the bevel gear segment and an arm connected with the bevel gear and movable therewith as a unit engaging the vibrator roller and effective to vibrate the same upon oscillation of the oscillatable member.

65. In an inker which is movable into and away from inking position, a vibrator roller, oscillatable bevel gear means for vibrating the vibrator roller and means including a readily engageable and disengageable fork and follower, engageable when the inker moves into inking position and disengageable when the inker moves away from inking position, for oscillating the bevel gear means.

66. In an inker which is movable into and away from inking position, a vibrator roller, oscillatable spur gear means, means including a readily engageable and disengageable connection, engageable when the inker moves into inking position and disengageable when the inker moves away from inking position, for oscillating the spur gear means, bevel gear means oscillated by the spur gear means and a connection from the bevel gear means to the vibrator roller to vibrate the same upon oscillation of the spur gear means.

67. In an inker which is movable into and away from inking position, a vibrator roller, an oscillatable member comprising a spur gear segment and a bevel gear segment, means including a readily engageable and disengageable connection, engageable when the inker moves into inking position and disengageable when the inker moves away from inking position, and a gear meshing with one of the segments for oscillating the oscillatable member and means including a gear meshing with the other segment for vibrating the vibrator roller upon oscillation of the oscillatable member.

68. In an inker which is movable into and away from inking position, a vibrator roller, an oscillatable member comprising a spur gear segment and a bevel gear segment, means including a readily engageable and disengageable fork and follower, engageable when the inker moves into inking position and disengageable when the inker moves away from inking position, and a spur gear meshing with the spur gear segment for oscillating the oscillatable member and means including a bevel gear meshing with the bevel gear segment for vibrating the vibrator roller upon oscillation of the oscillatable member.

69. In an inker having a plurality of sections which are assembleable and separatable, means for connecting the sections together when they are assembled, means for shifting the sections while connected together toward and from operative position relatively to a press and means guiding the sections for differential movement upon such shifting thereof, said connecting means serving as a pivot about the axis of which the sections relatively turn upon such shifting thereof.

70. In an inker having a plurality of sections which are assembleable and separatable, means for connecting the sections together when they are assembled, said means including a socket having a relatively narrow opening on one of the sections and means on the other section adapted to enter the socket through said opening when the sections are assembled and being thereupon turnable within the socket to connect the sections together, means for shifting the sections while connected together toward and from operative position relatively to a press and means guiding the sections for differential movement upon such shifting thereof, said connecting means serving as a pivot about the axis of which the sections relatively turn upon such shifting thereof.

71. In an inker having a plurality of sections which are assembleable and separatable, means for connecting the sections together when they are assembled, said means including means on the respective sections adapted to interengage when the sections are assembled and being thereupon relatively turnable to connect the sections together, means for shifting the sections while connected together toward and from operative position relatively to a press, means guiding the sections for differential movement upon such shifting thereof, said connecting means serving as a pivot about the axis of which the sections relatively turn upon such shifting thereof, and like connecting means for connecting the inker to the press.

72. In an inker having a plurality of sections which are assembleable and separatable, means for pivotally connecting the sections together when they are assembled, the assembled sections being shiftable toward and from operative position relatively to a press, and means guiding the sections for differential movement upon such shifting thereof, said connecting means serving as a pivot about the axis of which the sections relatively turn upon such shifting thereof.

73. In an inker, means for receiving a supply of ink, form rollers, transfer means for transferring ink from the first mentioned means to the form rollers, means for shifting the entire inker except the form rollers out of inking position, means effective during such shifting for guiding the entire inker except the form rollers in translatory movement and means further effective during such shifting for guiding a portion of the inker to turn about another portion thereof.

74. In an inker, an ink fountain, form inking means and transfer means for transferring ink from the ink fountain to the form inking means, the ink fountain and transfer means being so constructed and arranged as to be movable together to a position remote from the form inking means while the form inking means remain in inking position, the ink fountain and transfer means being so constructed and arranged as to be relatively bodily shiftable.

75. In an inker for a printing press, a form roller, a vibrator roller which is adapted to contact the form roller when the inker is in inking position to transfer ink to the form roller, at least a portion of the inker including the vibrator roller being movable away from inking position, and connections for raising the vibrator roller out of contact with the form roller and relatively to part of said portion of the inker, the inker being so constructed and arranged that movement of said portion of the inker away from inking position causes said connections to so raise the vibrator roller.

76. In an inker for a printing press, a form roller, a vibrator roller which is adapted to contact the form roller when the inker is in inking position to transfer ink to the form roller, at least a portion of the inker including the vibrator roller being movable away from inking position, a connection with the press for vibrating the vibrator roller, said connection being automatically separable upon movement of said portion of the inker away from inking position, and connections for raising the vibrator roller out of contact with the form roller, the inker being so constructed and arranged that movement of said portion of the inker away from inking position causes said connections to so raise the vibrator roller.

77. In an inker for a printing press, a vibrator roller, an oscillatable member, connections between the oscillatable member and the vibrator roller for vibrating the vibrator roller upon oscillation of the oscillatable member, means driven directly from the press for oscillating said oscillatable member, and means including an operating member normally stationary relatively to the inker frame but shiftable for varying the amplitude of oscillation of said oscillatable member, said operating member being shiftable without partaking of the movement of said oscillatable member while the inker is operating.

78. In an inker, a vibrator roller, an oscillatable member, connections between the oscillatable member and the vibrator roller for vibrating the vibrator roller upon oscillation of the oscillatable member, means for varying the amplitude of oscillation of said oscillatable member, and shiftable means for operating said means, said operating means being normally stationary relatively to the inker frame but shiftable without partaking of the movement of said oscillatable member while the inker is operating.

79. In an inker, a vibrator roller, an oscillatable member, connections between the oscillatable member and the vibrator roller for vibrating the vibrator roller upon oscillation of the oscillatable member, and means for varying the amplitude of oscillation of said oscillatable member, said means including a quickly shiftable member normally stationary relatively to the inker frame but shiftable without partaking of the movement of said oscillatable member while the inker is operating and means for holding said quickly shiftable member in any desired one of a plurality of positions.

80. In an inker, a vibrator roller, means for vibrating the roller, means for varying the amplitude of vibration of the roller, and quickly shiftable means for operating said last mentioned means, said operating means being normally stationary relatively to the inker frame but shiftable without partaking of the movement of the roller vibrating means while the inker is operating.

81. In an inker, a vibrator roller, means for vibrating the roller, and means for varying the amplitude of vibration of the roller including an angularly oscillatable member, a connecting member engaging the oscillatable member to be oscillated thereby and the place of whose engagement on the oscillatable member may be varied and means normally stationary relatively to the inker frame but manually shiftable without partaking of the movement of said oscillatable member while the inker is operating for varying the place of engagement of the connecting member on the oscillatable member.

82. In an inker, a vibrator roller, means for vibrating the roller, and means for varying the amplitude of vibration of the roller including an angularly oscillatable member, a connecting member engaging the oscillatable member to be oscillated thereby and the place of whose engagement on the oscillatable member may be varied, a quickly shiftable member normally stationary relatively to the inker frame but manually shiftable without partaking of the movement of said oscillatable member while the inker is operating for varying the place of engagement of said connecting member on said oscillatable member and means for holding said quickly shiftable member in any desired one of a plurality of positions.

83. In an inker, a vibrator roller, means for vibrating said roller and means normally stationary relatively to the inker frame but shiftable for varying the amplitude of vibration of said roller, said last mentioned means being shiftable without partaking of the vibratory movement of said roller while the inker is operating.

84. In an inker, a vibrator roller, means for vibrating said roller, said means including an oscillating member, and means for varying the amplitude of vibration of said roller, said last mentioned means including a guide guiding said oscillating member in its oscillating movements and means normally stationary relatively to the inker frame but shiftable without partaking of said oscillating movements while the inker is operating for movably positioning said guide.

85. In an inker, a primary section including an ink fountain and means for delivering ink therefrom toward the point of application to the form, the primary section being withdrawable from inking position, and a secondary section including means for receiving ink from the primary section and delivering the same further toward the point of application to the form, the secondary section being turnable out of inking position upon withdrawal of the primary section, the primary section having holding means so constructed and arranged that when both the primary section and the secondary section are in inking position the holding means on the primary section engages a portion of the secondary section to assist in maintaining the secondary section in position.

86. In an inker, means for receiving a supply of ink, form inking means, transfer means connected with the first mentioned means for transferring ink from the first mentioned means to the form inking means, the transfer means including a transfer roller engaging the form inking means, means for shifting the first mentioned means and the transfer means together out of inking position while they are connected to each other to clear the form inking means and means for guiding the transfer means for pivotal movement whereby to swing the transfer roller out of contact with the form inking means during such shifting.

87. In an inker, means for receiving a supply of ink, form inking means, transfer means connected with the first mentioned means for transferring ink from the first mentioned means to the form inking means, means for shifting the first mentioned means and the transfer means together out of inking position while they are connected to each other to clear the form inking means and means for guiding at least the portion of the transfer means nearest the form inking means pivotally upwardly away from the form inking means during such shifting.

88. In an inker, means for receiving a supply of ink, form inking means, transfer means connected with the first mentioned means for transferring ink from the first mentioned means to the form inking means, means for shifting the first mentioned means and the transfer means together out of inking position while they are connected to each other to clear the form inking means and means for rectilinearly translatorily guiding the first mentioned means and swingingly guiding at least the portion of the transfer means nearest the form inking means upwardly and outwardly away from the form inking means during such shifting.

89. In an inker, an ink supply roller, means for intermittently turning the ink supply roller, a plurality of ductor rollers, means for shifting the ductor rollers toward and away from the ink supply roller, and means operated by the means for intermittently turning the ink supply roller determining the period of engagement between the ink supply roller and each ductor roller when the ductor roller has been shifted toward the ink supply roller.

JOHN KUNZ.